(12) United States Patent
Higuchi et al.

(10) Patent No.: US 8,399,147 B2
(45) Date of Patent: Mar. 19, 2013

(54) ELECTROLYTE-ELECTRODE ASSEMBLY COMPRISING AN APATITE-TYPE OXIDE ELECTROLYTE AND METHOD FOR MANUFACTURING THE SAME

(75) Inventors: Yoshikatsu Higuchi, Wako (JP); Yuji Saito, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 325 days.

(21) Appl. No.: 12/810,959

(22) PCT Filed: Dec. 12, 2008

(86) PCT No.: PCT/JP2008/072605
§ 371 (c)(1),
(2), (4) Date: Jun. 28, 2010

(87) PCT Pub. No.: WO2009/084404
PCT Pub. Date: Jul. 9, 2009

(65) Prior Publication Data
US 2010/0285391 A1    Nov. 11, 2010

(30) Foreign Application Priority Data

Dec. 28, 2007 (JP) ................. 2007-339002
Dec. 28, 2007 (JP) ................. 2007-339003
Jan. 28, 2008 (JP) ................. 2008-016671

(51) Int. Cl.
*H01M 8/02* (2006.01)
*H01M 8/10* (2006.01)

(52) U.S. Cl. ......... 429/485; 429/482; 429/488; 429/523

(58) Field of Classification Search .................. 429/483, 429/489, 495, 535, 524, 209, 532, 523, 485, 429/488, 482; 264/618; 204/192.17
See application file for complete search history.

(56) References Cited

U.S. PATENT DOCUMENTS

| | | | |
|---|---|---|---|
| 6,482,539 B1 * | 11/2002 | Van Berkel et al. | 429/495 |
| 2003/0180595 A1 * | 9/2003 | Nakayama et al. | 429/33 |
| 2004/0234859 A1 * | 11/2004 | Lee et al. | 429/231.95 |
| 2005/0100770 A1 | 5/2005 | Sugawara et al. | |

(Continued)

FOREIGN PATENT DOCUMENTS

| | | |
|---|---|---|
| JP | 11-130595 | 5/1999 |
| JP | 2001-68130 | 3/2001 |

(Continued)

OTHER PUBLICATIONS

Machine Translation of: JP 2006/040612A, Fukui et al., Feb. 9, 2006.*

(Continued)

*Primary Examiner* — Basia Ridley
*Assistant Examiner* — Kenneth Douyette
(74) *Attorney, Agent, or Firm* — Nelson Mullins Riley & Scarborough LLP; Anthony A. Laurentano

(57) ABSTRACT

An electrolyte-electrode assembly (MEA) includes: an electrolyte; an anode side electrode and a cathode side electrode formed so as to sandwich the electrolyte via intermediate layers. The anode side electrode has a thickness set to 1 μm, for example. A method for manufacturing the electrolyte-electrode assembly, i.e., the MEA includes a step for forming the anode side electrode by sputtering.

5 Claims, 18 Drawing Sheets

U.S. PATENT DOCUMENTS

| | | |
|---|---|---|
| 2007/0122712 A1 * | 5/2007 | Kang et al. .................... 429/232 |
| 2007/0243469 A1 * | 10/2007 | Kim et al. ..................... 429/232 |
| 2007/0264574 A1 * | 11/2007 | Kim et al. .................. 429/231.8 |

FOREIGN PATENT DOCUMENTS

| | | |
|---|---|---|
| JP | 2002-252005 | 9/2002 |
| JP | 2003-346817 | 12/2003 |
| JP | 2004-355814 | 12/2004 |
| JP | 2005-149795 | 6/2005 |
| JP | 2006-40612 | 2/2006 |
| JP | 2007/059142 A1 * | 3/2007 |

OTHER PUBLICATIONS

Japanese Office Action for Application No. 2007-339002, dated Feb. 14, 2012.

International Search Report for Application No. PCT/JP2008/072605, dated Mar. 24, 2009.

* cited by examiner

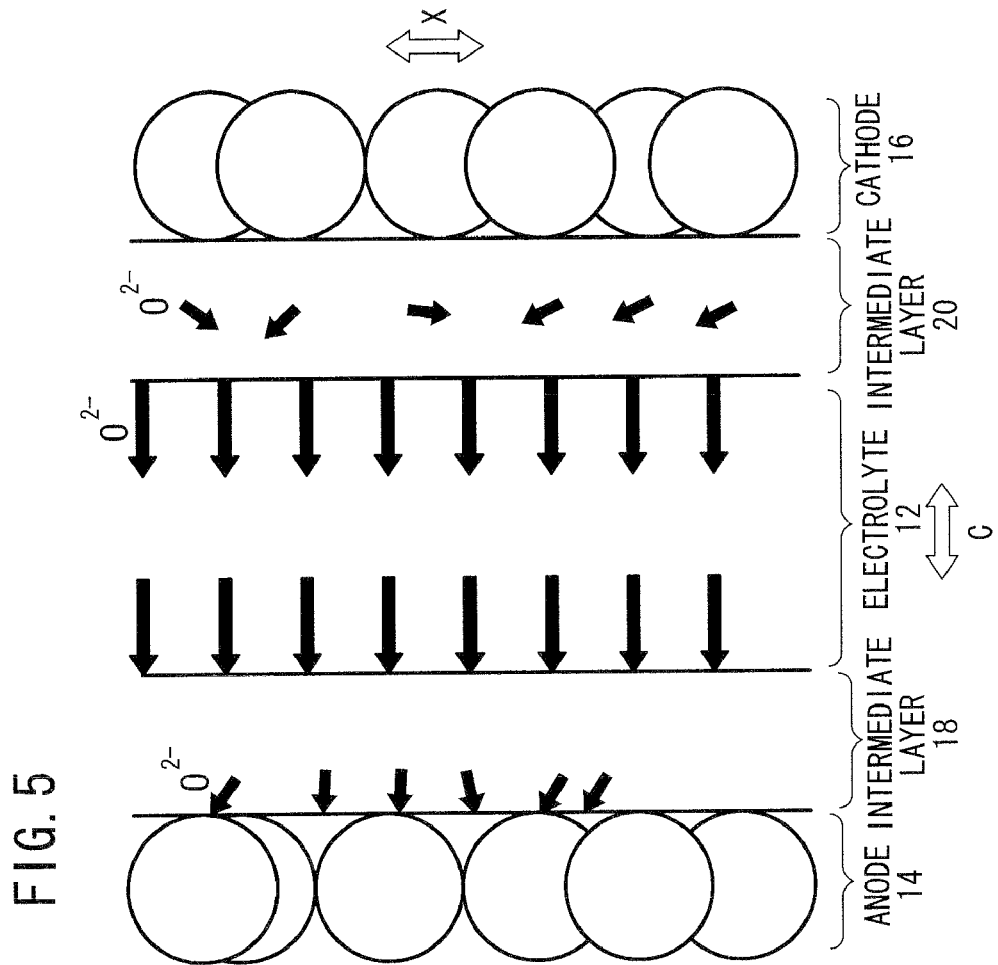

FIG. 6

| | ANODE COMPOSITION | FORMATION METHOD | HEAT TREATMENT TEMPERATURE [°C] | Pt PARTICLE DIAMETER [nm] | ANODE THICKNESS [nm] | INTERMEDIATE LAYER COMPOSITION | INTERMEDIATE LAYER THICKNESS [nm] | OUTPUT AT 500°C [mW/cm$^2$] | OUTPUT AT 300°C [mW/cm$^2$] |
|---|---|---|---|---|---|---|---|---|---|
| EX. 1 | 75%Pt-SDC | SPUTTERING | 500 | >10 | 200 | SDC | 200 | 423 | 4.2 |
| EX. 2 | 75%Pt-SDC | SPUTTERING | 500 | >10 | 200 | SDC | 100 | 528 | 5.1 |
| EX. 3 | 75%Pt-SDC | SPUTTERING | 500 | >10 | 200 | YDC | 500 | 123 | 1.2 |
| EX. 4 | 75%Pt-SDC | SPUTTERING | 500 | >10 | 200 | YDC | 50 | 145 | 2.4 |
| EX. 5 | 75%Pt-SDC | SPUTTERING | 500 | >10 | 200 | YDC | 100 | 205 | 2.1 |
| EX. 6 | 75%Pt-SDC | SPUTTERING | 500 | >10 | 200 | YDC ONLY ON CATHODE | 100 | 153 | 1.3 |
| EX. 7 | 75%Pt-SDC | SPUTTERING | 500 | >10 | 500 | YDC | 100 | 118 | 1.2 |
| EX. 8 | 50%Pt-SDC | SPUTTERING | 500 | >10 | 200 | YDC | 100 | 147 | 2.2 |
| EX. 9 | 75%Pt-SDC | SPUTTERING | NOT TREATED | >10 | 200 | YDC | 100 | 155 | 1.8 |
| EX. 10 | 100%Pt | SPUTTERING | 500 | >50 | 80 | SDC | 200 | 348 | 2.2 |
| EX. 11 | 100%Pt | SPUTTERING | NOT TREATED | >10 | 80 | YDC | 200 | 128 | 1.7 |
| EX. 12 | 100%Pt | SPUTTERING | NOT TREATED | >10 | 80 | SDC | 200 | 728 | 8.2 |
| COMP. EX. 1 | 75%Pt-SDC | SPUTTERING | 700 | <50 | 200 | YDC | 100 | 2.9 | 0.07 |
| COMP. EX. 2 | 50%Pt-SDC | SPUTTERING | 700 | <50 | 200 | YDC | 100 | 4.5 | 0.36 |
| COMP. EX. 3 | 75%Pt-SDC | SINTERING | 900 | <1000 | 10000 | YDC | 200 | 25 | 0.11 |
| COMP. EX. 4 | 75%Pt-SDC | SINTERING | 1400 | <1000 | 10000 | YDC | 200 | 11 | 0.22 |
| COMP. EX. 5 | 75%Pt-SDC | SINTERING | 1400 | <1000 | 10000 | YDC | 500 | 18 | 0.31 |
| COMP. EX. 6 | 50%Pt-SDC | SINTERING | 1400 | <1000 | 10000 | YDC | 200 | 2.5 | 0.09 |
| COMP. EX. 7 | 25%Pt-SDC | SINTERING | 1400 | <1000 | 10000 | YDC | 200 | 1.2 | 0.03 |
| COMP. EX. 8 | 75%Pt-SDC | SINTERING | 1400 | <1000 | 10000 | YDC | 1000 | 20 | 0.29 |

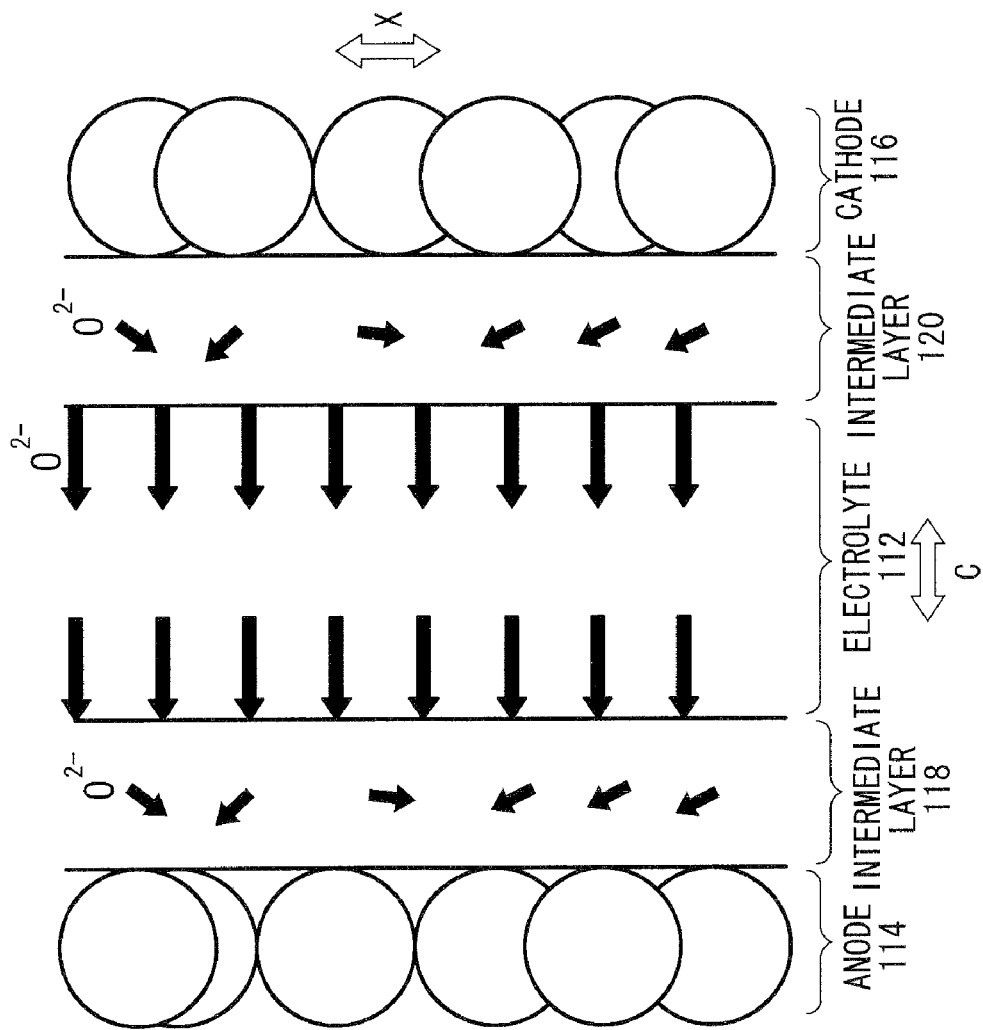

FIG. 11

| | ELECTROLYTE | | ANODE | | CATHODE | | INTERMEDIATE LAYER | | | | OUTPUT AT 500°C [mW/cm²] |
|---|---|---|---|---|---|---|---|---|---|---|---|
| | THICKNESS (D1) | SURFACE ROUGHNESS (Ra) | MATERIAL | GAP DISTANCE BETWEEN CONNECTION PORTIONS | MATERIAL | GAP DISTANCE BETWEEN CONNECTION PORTIONS | MATERIAL | THICKNESS (D2) | D2/Ra | D2/D1 | |
| EX. 13 | 300 μm | 2nm | 75%Pt-SDC | 20nm | LSCF | 500nm | SDC | 200nm | 100 | 1/1500 | 423 |
| EX. 14 | 300 μm | 2nm | 75%Pt-SDC | 20nm | LSCF | 500nm | SDC | 100nm | 50 | 1/3000 | 528 |
| EX. 15 | 300 μm | 2nm | 75%Pt-SDC | 20nm | LSCF | 500nm | YDC | 500nm | 250 | 1/600 | 123 |
| EX. 16 | 300 μm | 2nm | 75%Pt-SDC | 20nm | LSCF | 500nm | YDC | 50nm | 25 | 1/60 | 145 |
| EX. 17 | 300 μm | 2nm | 75%Pt-SDC | 20nm | LSCF | 500nm | YDC | 100nm | 50 | 1/3000 | 205 |
| EX. 18 | 300 μm | 2nm | 50%Pt-SDC | 20nm | LSCF | 500nm | YDC | 100nm | 50 | 1/3000 | 147 |
| EX. 19 | 300 μm | 2nm | Pt | 20nm | LSCF | 500nm | SDC | 200nm | 100 | 1/1500 | 348 |
| EX. 20 | 300 μm | 2nm | Pt | 20nm | LSCF | 500nm | YDC | 200nm | 100 | 1/1500 | 128 |
| EX. 21 | 300 μm | 2nm | Pt | 20nm | Pt | 20nm | SDC | 200nm | 100 | 1/1500 | 728 |
| EX. 22 | 500 μm | 400nm | 75%Pt-SDC | 5μm | LSCF | 500nm | YDC | 1μm | 2.5 | 1/500 | 83 |
| EX. 23 | 500 μm | 2μm | 75%Pt-SDC | 5μm | LSCF | 500nm | YDC | 5μm | 2.5 | 1/100 | 55 |
| COMP. EX. 9 | 300 μm | 400nm | 75%Pt-SDC | 5μm | LSCF | 500nm | YDC | 100nm | 0.25 | 1/4 | 13 |
| COMP. EX10 | 300 μm | 400nm | 75%Pt-SDC | 5μm | LSCF | 500nm | — | — | — | — | 12 |

FIG. 17

| | ELECTRODE COMPOSITION | ELECTRODE FORMATION METHOD | ANODE HEAT TREATMENT TEMPERATURE | ELECTRODE CRYSTALLINITY | ANODE THICKNESS | ELECTRODE PARTICLE DIAMETER | GAP DISTANCE BETWEEN CONNECTION PORTIONS | INTERMEDIATE LAYER COMPOSITION | INTERMEDIATE LAYER THICKNESS | OUTPUT AT 500°C [mW/cm²] | OUTPUT AT 300°C [mW/cm²] |
|---|---|---|---|---|---|---|---|---|---|---|---|
| EX. 24 | 75%-Pt-SDC | SPUTTERING | 500°C | AMORPHOUS | 200nm | 100nm | 0.1 μm | SDC | 200nm | 423 | 4.2 |
| EX. 25 | 75%-Pt-SDC | SPUTTERING | 500°C | AMORPHOUS | 200nm | 100nm | 0.1 μm | SDC | 100nm | 528 | 5.1 |
| EX. 26 | 75%-Pt-SDC | SPUTTERING | 500°C | AMORPHOUS | 200nm | 100nm | 0.1 μm | YDC | 500nm | 123 | 1.2 |
| EX. 27 | 75%-Pt-SDC | SPUTTERING | 500°C | AMORPHOUS | 200nm | 100nm | 0.1 μm | YDC | 50nm | 145 | 2.4 |
| EX. 28 | 75%-Pt-SDC | SPUTTERING | 500°C | AMORPHOUS | 200nm | 100nm | 0.1 μm | YDC | 100nm | 205 | 2.1 |
| EX. 29 | 75%-Pt-SDC | SPUTTERING | 500°C | AMORPHOUS | 200nm | 100nm | 0.1 μm | YDC ONLY ON CATHODE | 100nm | 153 | 1.3 |
| EX. 30 | 75%-Pt-SDC | SPUTTERING | 500°C | AMORPHOUS | 500nm | 100nm | 0.1 μm | YDC | 100nm | 118 | 1.2 |
| EX. 31 | 50%-Pt-SDC | SPUTTERING | 500°C | AMORPHOUS | 200nm | 100nm | 0.3 μm | YDC | 100nm | 147 | 2.2 |
| EX. 32 | 75%-Pt-SDC | SPUTTERING | NOT TREATED | AMORPHOUS | 200nm | 2nm | 50nm | YDC | 100nm | 155 | 1.8 |
| EX. 33 | 100%-Pt | SPUTTERING | NOT TREATED | AMORPHOUS | 80nm | 2nm | 80nm | SDC | 200nm | 348 | 2.2 |
| EX. 34 | 100%-Pt | SPUTTERING | NOT TREATED | AMORPHOUS | 80nm | 2nm | 80nm | YDC | 200nm | 128 | 1.7 |
| COMP. EX. 11 | 75%-Pt-SDC | SPUTTERING | 700°C | Pt | 200nm | 300nm | 1 μm | YDC | 100nm | 2.9 | 0.07 |
| COMP. EX. 12 | 50%-Pt-SDC | SPUTTERING | 700°C | Pt | 200nm | 300nm | 1 μm | YDC | 100nm | 4.5 | 0.36 |
| COMP. EX. 13 | 75%-Pt-SDC | SINTERING | 900°C | Pt, SDC | 10 μm | 500nm | 5 μm | YDC | 200nm | 25 | 0.11 |
| COMP. EX. 14 | 75%-Pt-SDC | SINTERING | 1400°C | Pt, SDC | 10 μm | 2 μm | 10 μm | YDC | 200nm | 11 | 0.22 |
| COMP. EX. 15 | 75%-Pt-SDC | SINTERING | 1400°C | Pt, SDC | 10 μm | 2 μm | 10 μm | YDC | 500nm | 18 | 0.31 |

ELECTROLYTE-ELECTRODE ASSEMBLY COMPRISING AN APATITE-TYPE OXIDE ELECTROLYTE AND METHOD FOR MANUFACTURING THE SAME

RELATED APPLICATIONS

This application is a 35 U.S.C. 371 national stage filing of International Application No. PCT/JP2008/072605, filed Dec. 12, 2008, which claims priority to Japanese Patent Application No. 2007-339002, filed on Dec. 28, 2007, Japanese Patent Application No. 2007-339003, filed on Dec. 28, 2007, and Japanese Patent Application No. 2008-016671, filed on Jan. 28, 2008, in Japan. The contents of the aforementioned applications are hereby incorporated by reference.

TECHNICAL FIELD

The present invention relates to an electrolyte-electrode joined assembly (electrolyte-electrode assembly) formed by disposing an electrolyte between an anode and a cathode and a method for producing (manufacturing) the same.

BACKGROUND ART

Fuel cells, oxygen sensors, oxygenation membrane devices, and the like have an electrolyte-electrode joined assembly produced by forming an anode and a cathode on surfaces of an oxide ion-conductive electrolyte. In such an assembly, oxygen is ionized on the cathode, and generated oxide ions are transferred through the electrolyte to the anode.

The above oxide ion transfer is accelerated at a relatively high temperature. The electrolyte-electrode joined assembly must be heated to such a high temperature in order to drive the fuel cell, etc. Thus, the fuel cell cannot produce electric power immediately as needed.

Accordingly, electrolytes containing substances excellent in oxide ion conductivity even at relatively low temperatures, have been proposed in recent years. Specifically, the substances include fluorite-type oxides such as scandium-stabilized zirconias (ScSZ) and samarium-doped cerias (SDC), perovskite-type oxides such as lanthanum gallate (LaSrGaMgO), etc. In addition, the applicant has proposed an oxide ion conductor containing an apatite-type composite oxide (see, e.g. Patent Document 1).

The apatite-type composite oxide is excellent in oxide ion conductivity. However, when the composite oxide is used as the electrolyte in the electrolyte-electrode joined assembly, the assembly often exhibits an insufficient power generation function. As a result of intense research, the present applicant has found that this is because the assembly has a relatively high interface resistance between the electrode and electrolyte, and thereby has a considerable IR loss. Thus, the present applicant has proposed an intermediate layer containing an isotropic conductive material, formed between the electrolyte and electrode in order to achieve a sufficient power generation function, in Patent Document 2.

Patent Document 1: Japanese Laid-Open Patent Publication No. 2002-252005
Patent Document 2: Japanese Laid-Open Patent Publication No. 2005-149795

DISCLOSURE OF INVENTION

A fuel cell using an electrolyte-electrode joined assembly described in Patent Document 2 has a satisfactory power generation property as compared with conventional fuel cells. However, the intermediate layer with a relatively high resistance has a large thickness of 1 μm or more, so that the assembly has a considerable high internal resistance. Thus, it is difficult to further improve the power generation property of the fuel cell.

A general object of the present invention is to provide an electrolyte-electrode joined assembly having a low internal resistance.

A principal object of the present invention is to provide an electrolyte-electrode joined assembly in which a reactant gas is readily diffused in an electrode.

Another object of the present invention is to provide an electrolyte-electrode joined assembly capable of improving a power generation property of a fuel cell.

A further object of the present invention is to provide a method for producing such an electrolyte-electrode joined assembly.

As a result of intense research, the present inventors have found that oxide ion conduction largely depends on the particle diameter of metal particles contained in an anode. The anode is generally formed by applying a paste and thereafter firing the applied paste. In this process, particles in the paste grow relatively large.

In this case, spaces are formed between the particles. The inventors have presumed that when a large number of the spaces are formed, the contact area between the anode and an intermediate layer is reduced, the contact distance therebetween is increased, and thus the intermediate layer cannot sufficiently produce the effect, whereby oxide ions cannot be readily transferred to the anode.

As a result of further intense research based on the above knowledge, the inventors have found that power generation can be significantly improved by controlling the metal particle diameter at a certain value or less. The present invention has been accomplished based on the finding.

Thus, according to an aspect of the present invention, there is provided an electrolyte-electrode joined assembly comprising an anode and a cathode with an electrolyte interposed therebetween, wherein the electrolyte comprises an apatite-type oxide in the form of a monocrystal having a face or a direction in which an oxide ion is transferred, or in the form of a polycrystal oriented along a face or a direction in which an oxide ion is transferred, the face or the direction being parallel to the thickness direction, the anode contains at least electron-conductive metal particles, and the metal particle has a particle diameter of less than 50 nm.

Conventional anodes formed by sintering have a metal particle diameter of more than 1 μm. In contrast, in the anode according to the present invention, the metal particle diameter is less than 50 nm (e.g. 10 nm or less). When the metal particle has such a small diameter, the anode has a dense compact structure. Thus, the contact area between the anode and the electrolyte (or an intermediate layer, if formed) is increased, and the contact distance therebetween is reduced, so that the oxide ion is efficiently accepted by the anode. As a result, the electrolyte-electrode joined assembly is excellent in oxide ion conductivity.

In the present invention, the metal particle diameter of the anode is controlled at a certain value or less in the foregoing manner. As a result, the resistance between the electrode and the electrolyte (or the intermediate layer) is lowered to improve the oxide ion conductivity. The oxide ion conductivity can be further improved by forming the intermediate layer. Even in this case, the thickness the intermediate layer can be reduced, and thus IR loss can be suppressed. Furthermore, the anode also can have a small thickness, so that a reactant gas supplied to the anode can be readily diffused.

The anode may contain oxide-ion-conductive oxide ceramic particles in addition to the metal particles. In this case, the content of the oxide ceramic particles is less than 75 vol %. In other words, according to the present invention, the metal particle:the oxide ceramic particle=100:0 through more than 25:less than 75.

In this case, the metal particles are in contact with each other continuously from an interface between the electrolyte and the anode to an exposed surface of the anode (i.e. continuously in the thickness direction in the entire anode). As a result, the reactant between the oxide ion and reaction gas can be efficiently developed in the anode.

The anode preferably has a thickness of less than 10 μm. In this case, the reactant gas can be readily diffused in the anode, whereby the electrode reaction can proceed efficiently.

Preferred examples of components of the metal particle include Ni, Co, Pd, Ag, Pt, Cu, and Zn. The metal particle may contain one or more metals selected therefrom.

Preferred examples of components of the oxide ceramic particle include a perovskite-type compound, a fluorite-type compound, and an apatite-type compound. The oxide ceramic particle may contain one or more thereof.

In each case, an intermediate layer having an isotropic conductivity and a thickness of less than 1 μm may be formed at least between the cathode and the electrolyte or between the anode and the electrolyte. When the intermediate layer is formed, the oxide ions can be isotropically transferred from the cathode to the electrolyte, and/or the oxide ions conducted in the c-axis direction of the electrolyte can be isotropically transferred from the electrolyte to the anode. As a result, the number of the oxide ions transferred between the electrolyte and anode or cathode is increased, and the interface resistance is lowered. Furthermore, since the intermediate layer has a small thickness, the intermediate layer has a low IR loss. For the reasons, the internal resistance of the electrolyte-electrode joined assembly is further lowered.

According to another aspect of the present invention, there is provided a method for producing an electrolyte-electrode joined assembly comprising an anode and a cathode with an electrolyte interposed therebetween, the method comprising the steps of:

selecting, as the electrolyte, an apatite-type oxide in the form of a monocrystal having a face or a direction in which an oxide ion is transferred, or in the form of a polycrystal oriented along a face or a direction in which an oxide ion is transferred, the face or the direction being parallel to the thickness direction;

forming the cathode on one surface of the electrolyte; and sputtering a metal target to deposit metal particles on the other surface of the electrolyte, thereby forming the anode containing the metal particles having a particle diameter of less than 50 nm.

Thus, in the present invention, the anode having a remarkably small metal particle diameter is formed by the sputtering. Therefore, the resultant electrolyte-electrode joined assembly is excellent in oxide ion conductivity.

As described above, the anode may contain a composite material of the metal particle and oxide ceramic particle. In this case, an oxide ion-conductive oxide ceramic target may be sputtered simultaneously or alternately with the metal target. Of course, the sputtering is carried out such that the content of the oxide ceramic particles is less than 75 vol %.

The method may further comprise the step of forming an intermediate layer having a thickness of less than 1 μm at least between the electrolyte and the cathode or anode.

The inventors have further intensely studied the internal resistance reduction in an electrolyte-electrode joined assembly from another viewpoint, and have paid attention to an electrolyte surface roughness in the course of the study. The inventors have presumed that when an electrolyte surface has an excessively large roughness, gaps (i.e. pores) are often formed between the surface and an electrode.

In an electrolyte of an apatite-type oxide, when a direction (e.g. c-axis direction), in which the electrolyte exhibits an excellent oxide ion conductivity, is aligned parallel to the thickness direction, the electrolyte has a remarkably high resistance against oxide ion transfer in directions other than the direction parallel to the thickness direction. As a result, the electrolyte has a higher oxide ion conductivity in the direction parallel to the thickness direction. The inventors have considered when the above pores are formed, oxide ions cannot be transferred in the above pore, thereby resulting in a lowered oxide ion conductivity. Thus, the inventors have studied the power generation function improvement from the viewpoint of the electrolyte surface roughness. The present invention has been accomplished based on the knowledge.

Thus, according to a further aspect of the present invention, there is provided an electrolyte-electrode joined assembly comprising an anode and a cathode with an electrolyte interposed therebetween, and an intermediate layer disposed at least between the cathode and the electrolyte or between the anode and the electrolyte, wherein the electrolyte comprises an apatite-type oxide in the form of a monocrystal having a face or a direction in which an oxide ion is transferred, or in the form of a polycrystal oriented along a face or a direction in which an oxide ion is transferred, the face or the direction being parallel to the thickness direction, the intermediate layer comprises a material that exhibits an isotropic oxide ion conduction and has a conductivity lower than that of the electrolyte, and the thickness of the intermediate layer is 2 to 250 times as large as the arithmetic average roughness Ra of a surface of the electrolyte and is $1/10000$ to $1/50$ of the thickness of the electrolyte.

When the intermediate layer thickness is controlled in relation to the thickness and the surface roughness (the arithmetic average height Ra) of the electrolyte in the above manner, the oxide ion can be efficiently transferred from the cathode to the intermediate layer and/or from the intermediate layer to the anode, thereby resulting in an improved oxide ion conductivity. Therefore, the resultant electrolyte-electrode joined assembly can have a low internal resistance, and a fuel cell using the assembly can have an excellent power generation property.

The cathode or anode generally has pores on the surface facing the intermediate layer. In this case, the cathode or anode has connection portions, which face each other across the pore and are in contact with the intermediate layer. The gap distance between the connection portions is preferably 5 μm or less, more preferably 1 μm or less. The gap distance means a distance from a point of a connection portion that firstly contacts with the intermediate layer to a point of an adjacent connection portion that firstly contacts with the intermediate layer.

When the cathode or anode has such a small gap distance, the oxide ion can be more efficiently transferred from the cathode to the intermediate layer and/or from the intermediate layer to the anode, so that the internal resistance can be further lowered.

The thickness of the intermediate layer is not particularly limited, and is preferably 5 μm or less in view of reducing the IR loss. The thickness may be 1 μm or less, preferably 50 to 200 nm. Thus, in the present invention, the intermediate layer with a relatively high resistance can have a remarkably smaller thickness as compared with the intermediate layer according to conventional techniques.

Preferred examples of components of the intermediate layer include fluorite-type compounds such as SDC, GDC, LDC, and YDC.

The inventors have intensely studied the internal resistance reduction from still another viewpoint. According to a still further aspect of the present invention, there is provided an electrolyte-electrode joined assembly comprising an anode and a cathode with an electrolyte interposed therebetween, wherein the electrolyte comprises an apatite-type oxide in the form of a monocrystal having a face or a direction in which an oxide ion is transferred, or in the form of a polycrystal oriented along a face or a direction in which an oxide ion is transferred, the face or the direction being parallel to the thickness direction, the anode or the cathode comprises particles joined to each other and has a thickness of less than 10 μm, the particles have a particle diameter of 100 nm or less and include at least an amorphous metal particle, the anode or the cathode has a pore on a surface contacting with the electrolyte or an intermediate layer disposed between the electrolyte and the anode, and a gap distance between the adjacent particles facing each other across the pore is 1 μm or less.

The gap distance means a distance from a point of a connection portion that firstly contacts with the electrolyte (or the intermediate layer) to a point of an adjacent connection portion that firstly contacts with the electrolyte (or the intermediate layer).

In the present invention, the particles in the anode or cathode have a small diameter, and thereby are in dense contact not only with each other but also with the electrolyte (or the intermediate layer). Because of the dense contact and the above small gap distance, the oxide ion can be transferred, at a higher rate, from the cathode to the electrolyte (or the intermediate layer) and/or from the electrolyte (or the intermediate layer) to the anode. Thus, the resistance between the electrode and the electrolyte (or the intermediate layer) is lowered, resulting in an improved oxide ion conductivity.

Furthermore, the anode or cathode has a small thickness, and thus has a low internal resistance.

For the above reasons, the internal resistance of the electrolyte-electrode joined assembly can be lowered. In other words, the resultant assembly can have a low internal resistance and an excellent oxide ion conductivity.

In addition, since the anode or cathode has a small thickness, a reactant gas can be readily diffused therein, whereby an electrode reaction can be efficiently developed advantageously.

The anode or cathode preferably has a porosity of 5 to 40 vol %. When the porosity is more than 40 vol %, the probability of transferring the oxide ions from the electrolyte (or the intermediate layer) to the anode or from the cathode (or the intermediate layer) to the electrolyte may be reduced.

The anode or cathode may contain oxide ion-conductive oxide ceramic particles in addition to the metal particles. In this case, the content of the oxide ceramic particles is less than 75 vol %. In other words, according to the present invention, the metal particle:the oxide ceramic particle=100:0 through more than 25:less than 75.

BRIEF DESCRIPTION OF DRAWINGS

FIG. 5 is a schematic, structural explanatory view showing an electrolyte-electrode joined assembly having an anode containing large metal particles;

FIG. 6 is a table showing the anode thickness, anode material, intermediate layer thickness, intermediate layer material, and output voltages of each unit fuel cell of Examples 1 to 12 and Comparative Examples 1 to 8;

FIG. 10 is a schematic, structural explanatory view showing the electrolyte-electrode joined assembly of FIG. 7;

FIG. 11 is a table showing the anode thickness, anode material, intermediate layer thickness, intermediate layer material, and output voltage of each unit fuel cell of Examples 13 to 23 and Comparative Examples 9 and 10;

FIG. 17 is a table showing the anode thickness, anode material, intermediate layer thickness, intermediate layer material, and output voltages of each unit fuel cell of Examples 24 to 34 and Comparative Examples 11 to 15.

BEST MODE FOR CARRYING OUT THE INVENTION

A preferred embodiment of the electrolyte-electrode joined assembly and the production method of the present invention will be described in detail below with reference to the accompanying drawings.

A first embodiment, in which a metal particle diameter of an anode is limited, will be described below.

Figure 1:
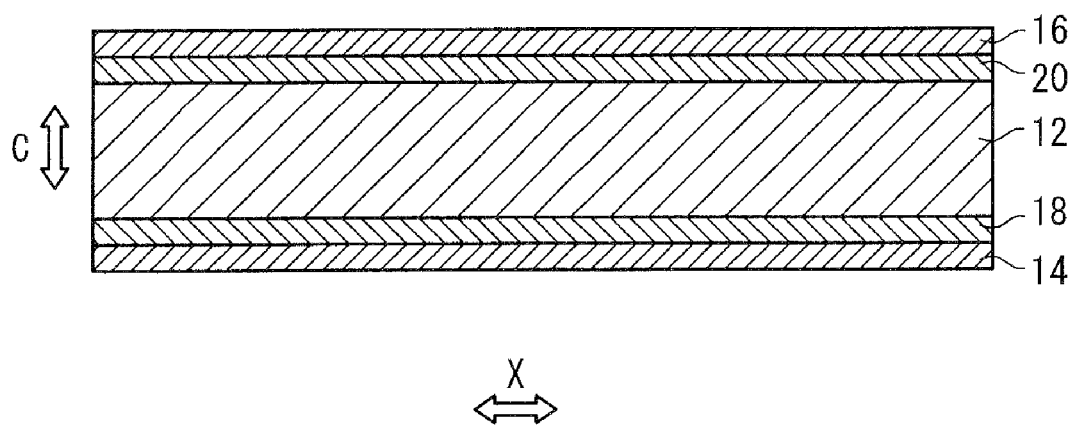
FIG. 1 is an overall, schematic, longitudinal sectional view of an electrolyte-electrode joined assembly according to a first embodiment of the present invention.

FIG. 1 is an overall, schematic, longitudinal sectional view showing an electrolyte-electrode joined assembly (hereinafter also referred to as "MEA") 10 according to the first embodiment. The MEA 10 is produced by forming an anode 14 and a cathode 16 on respective surfaces of an electrolyte 12. Intermediate layers 18, 20 are disposed between the anode 14 and the electrolyte 12 and between the cathode 16 and the electrolyte 12, respectively.

A monocrystal of an apatite-type composite oxide is preferably used as the electrolyte 12. The monocrystal can be produced by a known monocrystal production method such as the Czochralski method.

For example, a lanthanum-silicon composite oxide having a composition of $La_xSi_6O_{1.5X+12}$ (where $8 \leq X \leq 10$, throughout the following description) is used as the apatite-type composite oxide. The unit cell structure of the composite oxide is described below.

Figure 2:
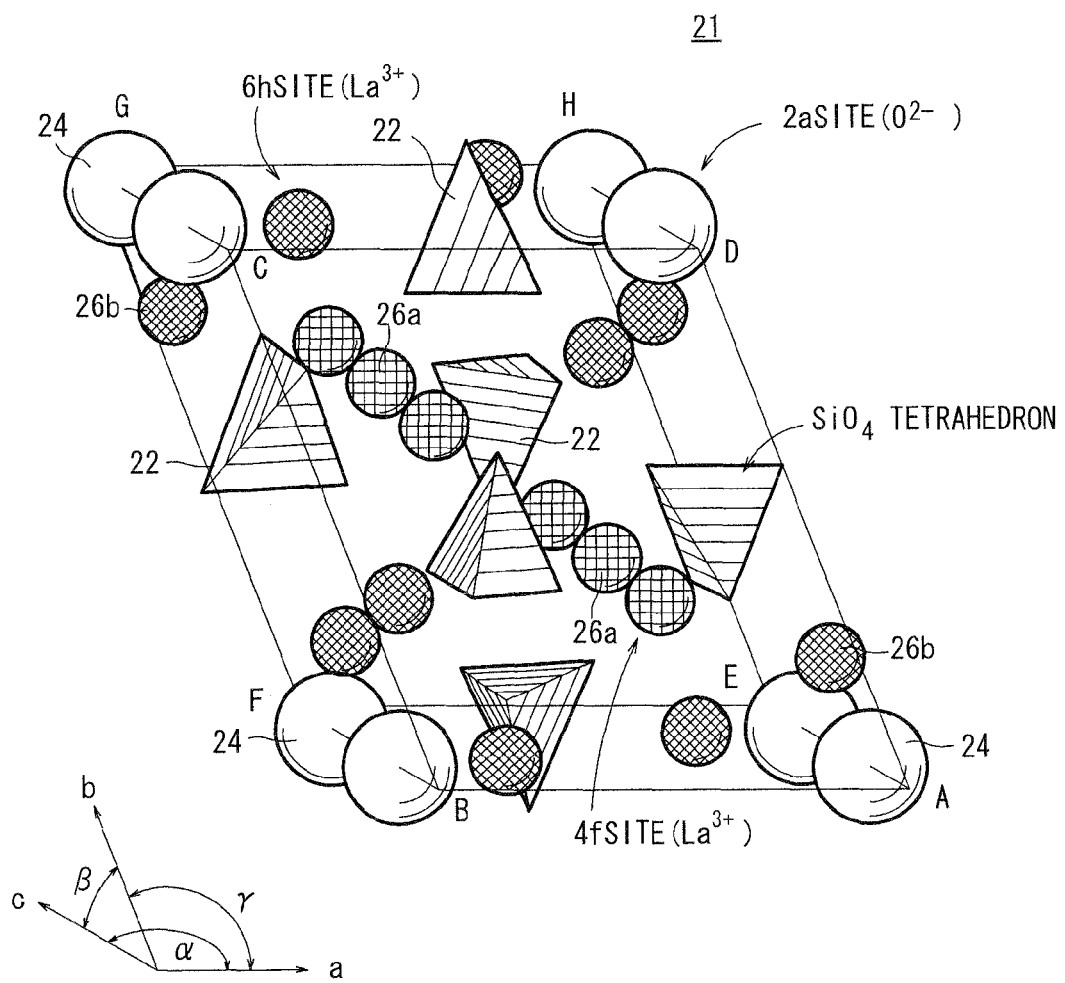
FIG. 2 is a structural view showing a unit cell made of $La_xSi_6O_{1.5X+12}$ observed in a c-axis direction.

The unit cell structure of $La_xSi_6O_{1.5X+12}$ observed in the c-axis direction is shown in FIG. 2. The unit cell 21 has an apatite-type structure containing six $SiO_4$ tetrahedrons 22, $O^{2-}$ 24 occupying the 2a site, and $La^{3+}$ 26a, 26b occupying the 4f and 6h sites. $Si^{4+}$ and $O^{2-}$ in the $SiO_4$ tetrahedrons 22 are not shown.

The unit cell 21 has a hexagonal crystal-like structure. Thus, in the unit cell 21 shown in FIG. 2, the angle $\alpha$ between the side AB in the a-axis direction and the side BF in the c-axis direction, the angle $\beta$ between the side BC in the b-axis direction and the side BF, and the angle $\gamma$ between the sides AB and BC are 90°, 90°, and 120°, respectively. The length of the side AB is the same as the side BC and different from the side BF.

It is presumed that $La_xSi_6O_{1.5X+12}$ having such an apatite-type structure can be used as an oxide ion conductor, because the $O^{2-}$ occupying the 2a site is not bonded to the $SiO_4$ tetrahedron 22 or to the $La_xSi_6O_{1.5X+12}$. The $O^{2-}$ 24 is not under a strong force, so that the $O^{2-}$ is not fixed in the 2a site and can be transferred relatively freely in the c-axis direction.

Thus, in each crystal of the electrolyte 12, oxide ions are transferred in the c-axis direction. Therefore, the electrolyte 12 exhibits high oxide ion conductivity in the c-axis direction, while exhibiting low oxide ion conductivity in the a-axis and b-axis directions. In other words, the electrolyte 12 has anisotropic oxide ion conductivity.

In the first embodiment, as shown by the arrow C in FIG. 1, the thickness direction of the electrolyte 12 corresponds to the c-axis direction. The anode 14 and the cathode 16 are perpendicular to the direction in which the electrolyte 12 shows the highest oxide ion conductivity, whereby oxide ions can be readily transferred from the cathode 16 to the anode 14.

The thus-formed electrolyte 12 has a thickness of 50 to 800 μm. When the thickness is less than 50 μm, the electrolyte 12 cannot have sufficient strength for forming the anode 14 and cathode 16, so that the electrolyte 12 is easily broken, and the MEA 10 cannot be easily produced. On the other hand, when the thickness is more than 800 μm, oxide ions cannot be readily transferred, and the IR loss is increased, so that the resultant MEA 10 has insufficient power generation characteristics. The thickness of the electrolyte 12 is preferably 100 μm or more.

The electrolyte 12 preferably has a conductivity of 0.01 S/cm at 500° C. and a conductivity of 0.001 S/cm at 300° C., as measured by a direct-current 4-terminal method. The conductivity thereof is more preferably 0.1 S/cm, and even more preferably 0.3 S/cm, at 700° C. It should be understood that the conductivity is in the c-axis direction, i.e., the thickness direction of the electrolyte 12 (the direction of the arrow C in FIG. 1).

Though the monocrystal of the apatite-type composite oxide is preferably used as the electrolyte 12 in this embodiment as described above, the electrolyte 12 may be composed of another apatite-type composite oxide produced by another method as long as it has the above conductivity. Examples of such apatite-type composite oxides include a sintered body obtained by firing a formed body oriented under a magnetic field, a polycrystal obtained by firing a compact formed by a sol-gel method, and an apatite-type composite oxide obtained by a gas phase synthesis method such as a CVD (Chemical Vapor Deposition), PLD (Pulsed Laser Deposition), or ALD (Atomic Layer Deposition) method.

When the electrolyte 12 exhibits such high conductivity at a relatively low temperature, a fuel cell containing the MEA 10 can have excellent power generating characteristics even at relatively low temperatures. Also, the fuel cell can be heated to its driving temperature in a remarkably shorter time period.

In this embodiment, the anode 14 is composed of a composite material of a metal Pt and an oxide ceramic Sm-doped $CeO_2$ (SDC) (hereinafter referred to as "Pt-SDC"). Of course, when the anode 14 is observed using a scanning electron microscope (SEM) or the like, Pt particles and SDC particles joined to each other are observed.

It is a matter of course that the Pt is capable of conducting electrons, and the SDC comprises an oxide ion conductor. Thus, the anode 14 contains the electron conductor and the oxide ion conductor, and thereby acts as a mixed conductor having both the electron conductivity and the oxide ion conductivity.

The Pt particle has a particle diameter of less than 50 nm. The adjacent Pt particles are in contact with each other, whereby the Pt particles form a three-dimensional webbing structure (network). The network has a continuous structure from the interface between the anode 14 and the intermediate layer 18 to the exposed surface of the anode 14. Therefore, electrons can be transferred along the Pt particles in the anode 14.

The anode 14 containing the fine Pt particles can be formed by sputtering to be described later. Since the Pt particle has a remarkably small size, the anode 14 can readily accept the oxide ion.

Meanwhile, the SDC particles are distributed such that spaces between the Pt particles are filled therewith. The oxide ion can be diffused in the anode 14 due to the SDC particle. Also the SDC particle has a particle diameter of less than 50 nm.

The ratio of the SDC to the total of the Pt and SDC is less than 75 vol %. When the SDC ratio is more than 75 vol %, the anode 14 is insufficient in the electron conductivity.

The anode 14 has a thickness of less than 10 μm. This thickness is significantly smaller, as compared with conventional anodes, which have a thickness of several tens to several hundreds μm.

When the anode 14 has such a thickness, for example, difficulty in diffusing a reactant gas (fuel gas) in the anode 14 can be prevented.

The cathode 16 preferably comprises an oxide ceramic such as $La_xSr_{1-x}Co_yFe_{1-y}O_\alpha$, $Ba_xSr_{1-x}Co_yFe_{1-y}O_\alpha$, or $Sm_xSr_{1-x}CoO_\alpha$ (where $0 \leq X \leq 1$ and $0 \leq Y \leq 1$, throughout the following description), though the cathode 16 may be composed of the same material as the anode 14. Alternatively, the cathode 16 may comprise a cermet of the oxide ceramic and the above metal.

The intermediate layers 18, 20 preferably comprise a fluorite-type oxide, specific examples of which include SDC, $Y_2O_3$-doped $CeO_2$ (YDC), $Gd_2O_3$-doped $CeO_2$ (GDC), and $La_2O_3$-doped $CeO_2$ (LDC). Such oxides have isotropic oxide ion conductivity. Thus, the intermediate layers 18, 20 exhibit approximately constant oxide ion conductivity, in both the thickness direction (the C direction in FIG. 1) and the lateral direction (the X direction in FIG. 1) thereof. The oxide ion conductivities of the intermediate layers 18, 20 are lower than that of the electrolyte 12 in the thickness direction.

As described below, by forming the intermediate layers 18, 20, the number of oxide ions transferred from the cathode 16 to the electrolyte 12 and the number of oxide ions transferred from the electrolyte 12 to the anode 14 can be increased, whereby oxide ion conductivity can be increased.

An oxide such as SDC, YDC, GDC or LDC acts as a mixed conductor, which exhibits both oxide ion conductivity and electron conductivity. Such a mixed conductor contributes to the aforementioned rapid oxide ion conduction from the cathode 16 to the anode 14, and additionally accelerates oxygen ionization on the cathode 16, and binding of oxide ions to hydrogen (generation of water and electrons) on the anode 14. Thus, the mixed conductor accelerates reactions on the electrodes, thereby improving the power generation function of the fuel cell.

The thicknesses of the intermediate layers 18, 20 are less than 1 μm, preferably 50 to 500 nm, and more preferably 50 to 200 nm. When the thicknesses thereof are 1 μm or more, the intermediate layers 18, 20 have a considerably high internal resistance. Thus, though the intermediate layers 18, 20 have resistivities which are larger than that of the electrolyte 12, the resistances of the intermediate layers 18, 20 can be lowered by controlling the thicknesses within the significantly small thickness range in order to reduce the IR loss of the MEA 10.

The MEA 10 has an overall thickness suitable for ensuring sufficient strength. Specifically, the overall thickness may be 1 mm or less. When the thickness is more than 1 mm, the MEA 10 has a large volume, thus resulting in poor energy efficiency per unit volume.

More preferably, the MEA 10 has a smaller thickness. However, the electrolyte 12 should have a thickness of at least 50 μm as described above, wherein the MEA 10 is thicker than the electrolyte 12. In view of ensuring the sufficient strength, the thickness of the MEA 10 is preferably 100 μm or greater, and more preferably 200 μm or greater. Most preferably, the MEA 10 has a thickness of 200 to 600 μm in order to achieve optimum strength and high oxide ion conductivity.

Figure 3:
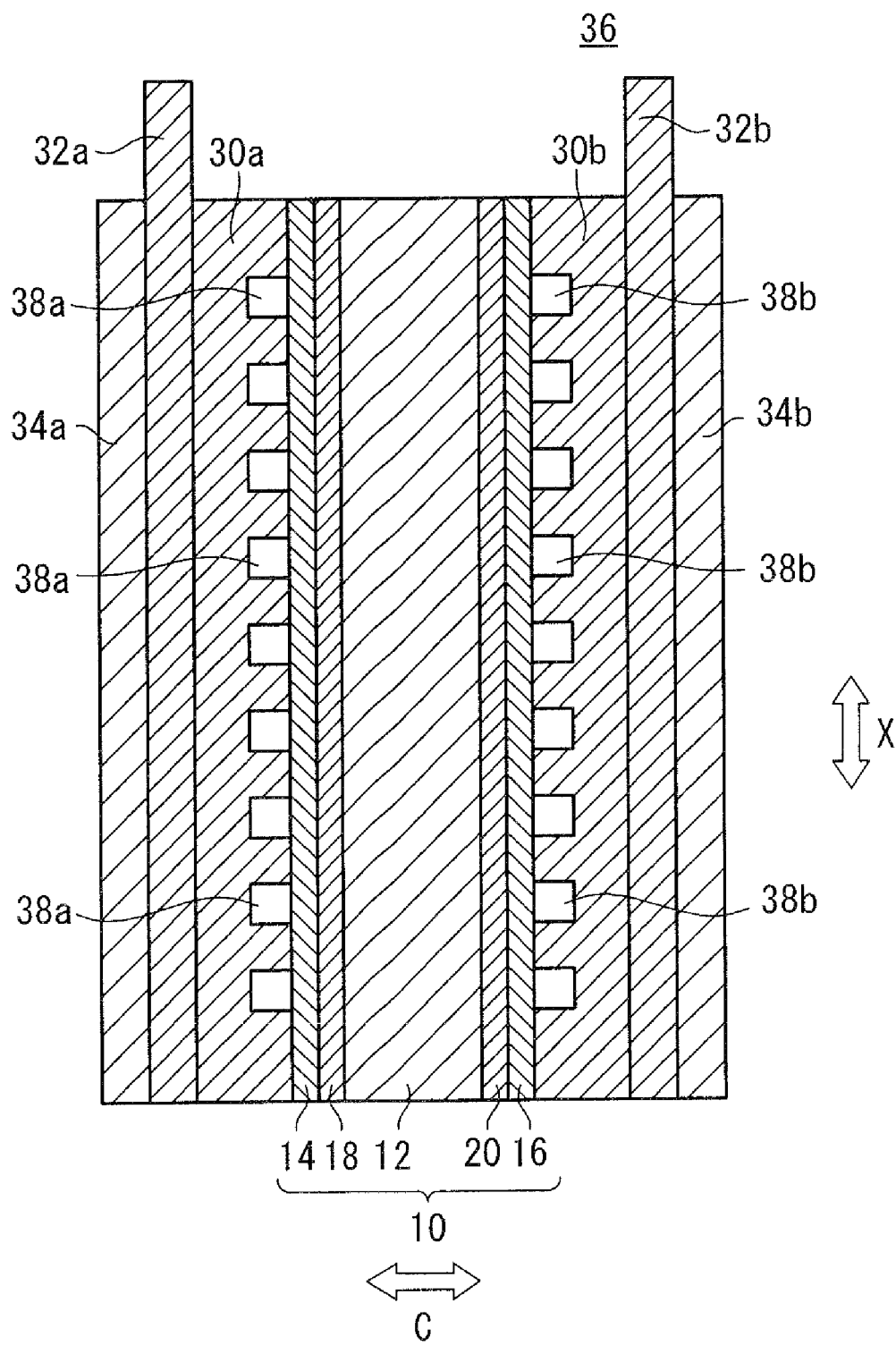
FIG. 3 is a schematic, longitudinal sectional view showing a unit fuel cell using the self-supporting electrolyte-electrode joined assembly of FIG. 1.

When the above MEA 10 is used for forming a unit fuel cell, the MEA 10 is interposed between a pair of separators 30a, 30b as shown in FIG. 3. Current collecting terminals 32a, 32b are disposed outside the separators 30a, 30b, respectively, and end plates 34a, 34b are disposed outside the current collecting terminals 32a, 32b, respectively. The end plates 34a, 34b are connected to each other by bolts (not shown), whereby the MEA 10, the separators 30a, 30b, and the current collecting terminals 32a, 32b are sandwiched by the end plates 34a, 34b, so as to form the unit fuel cell 36. Gas passages 38a, 38b for supplying the fuel gas and oxygen-containing gas to the anode 14 and the cathode 16 are formed respectively in the separators 30a, 30b.

The unit fuel cell 36 is driven after being heated to a low or medium temperature of approximately 300° C. to 700° C., preferably 500° C. After heating, the oxygen-containing gas is supplied through the gas passages 38b in the separator 30b, while the hydrogen-containing fuel gas is supplied through the gas passages 38a in the separator 30a.

Oxygen in the oxygen-containing gas is bonded to electron on the cathode 16 to generate an oxide ion ($O^{2-}$). The generated oxide ion is transferred from the cathode 16 to the electrolyte 12.

Figure 4:
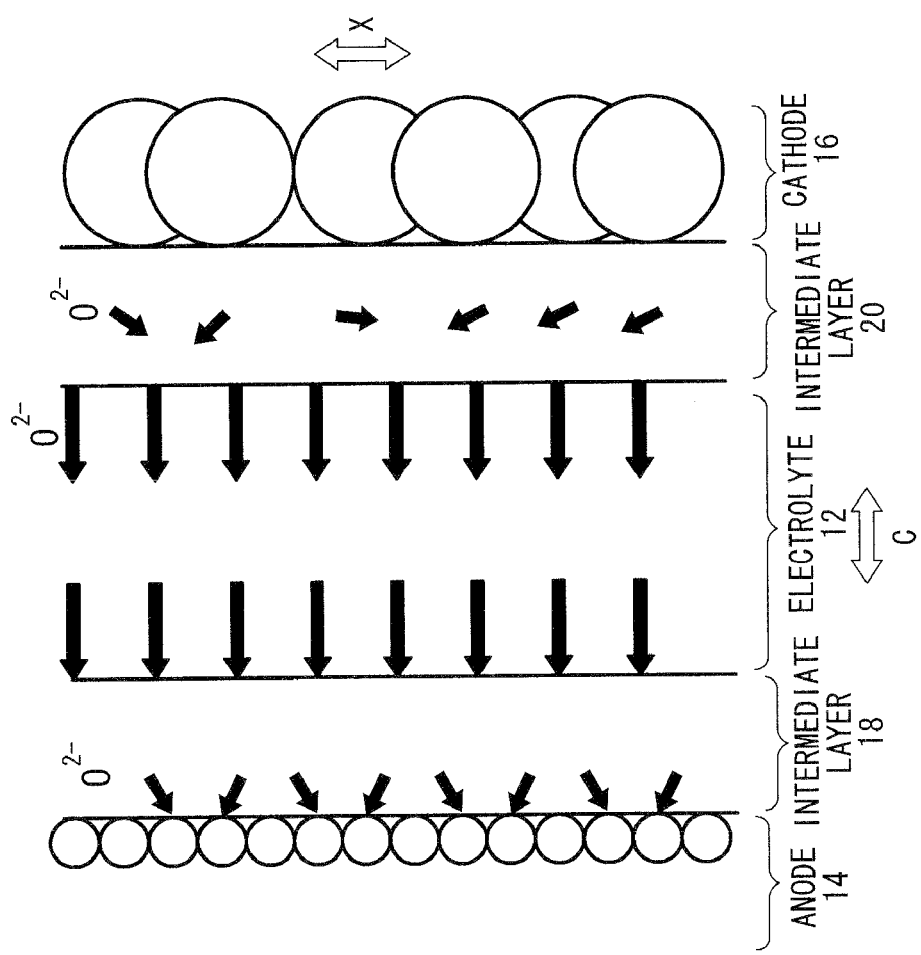
FIG. 4 is a schematic, structural explanatory view showing the electrolyte-electrode joined assembly of FIG. 1.

An MEA 10 having intermediate layers 18, 20 is shown schematically in FIG. 4. As shown in FIG. 4, oxide ions are transferred from the cathode 16 to the intermediate layer 20, move randomly within the intermediate layer 20, and are introduced to a contact region between the electrolyte 12 and the intermediate layer 20. This is because the intermediate layer 20 comprises the substance having isotropic oxide ion conductivity, such as SDC, YDC, GDC, or LDC, as described above. Thus, not only oxide ions that are transferred straightly, but also oxide ions transferred obliquely within the intermediate layer 20, penetrate the electrolyte 12. As a result, the number of the oxide ions introduced into the electrolyte 12 is increased significantly.

Oxide ions are then transferred in the electrolyte 12 toward the anode 14. The electrolyte 12 is disposed such that oxide ions can be most readily transferred to the anode 14 in the thickness direction (the direction of the arrow C) thereof. Therefore, oxide ions can be rapidly transferred.

Thus, oxide ion conductivity is increased when a substance having anisotropic oxide ion conductivity (such as an apatite-type composite oxide) is used in the electrolyte 12, and the face or direction in which oxide ions are conducted is parallel to the thickness direction. Oxide ions can be readily transferred in the electrolyte 12 even at relatively low temperatures, whereby the unit fuel cell 36 has satisfactory power generation characteristics at such low temperatures.

Oxide ions are further transferred from the electrolyte 12 through the intermediate layer 18 to the anode 14. Also in this process, since the intermediate layer 18 contains the substance having the isotropic oxide ion conductivity such as SDC, YDC, GDC, or LDC, oxide ions randomly move in the intermediate layer 18 and move toward a contact region between the intermediate layer 18 and the anode 14 (i.e. the Pt particle or the SDC particle). It is a matter of course that not only oxide ions transferred straight but also oxide ions transferred obliquely in the intermediate layer 18 are received by the anode 14. As a result, the number of the oxide ions introduced into the anode 14 is significantly increased.

As described above, by interposing the intermediate layers 20, 18 between the cathode 16 and the electrolyte 12 and between the electrolyte 12 and the anode 14, respectively, the numbers of the oxide ions transferred from the cathode 16 to the electrolyte 12 and the oxide ions transferred from the electrolyte 12 to the anode 14 are increased, thereby to improve the oxide ion conductivity. In this case, the interface resistance between the electrolyte 12 and the cathode 16 is lowered, thereby to reduce the overvoltage.

Furthermore, in this case, both the Pt and SDC particles have a remarkably small particle diameter of less than 50 nm. Therefore, the anode 14 is densely filled with the particles. The number of the Pt and SDC particles in contact with the intermediate layer 18 is larger in the dense anode 14 shown in FIG. 4 than in a relatively nondense anode shown in FIG. 5 containing large particles.

Thus, in the first embodiment, since both the Pt and SDC particles have a particle diameter of less than 50 nm, the contact area between the anode 14 and the intermediate layer 18 is substantially increased. As a result, oxide ions transferred through the intermediate layer 18 can be readily received by the anode 14, so that the MEA 10 is excellent in oxide ion conductivity. Furthermore, since the anode 14 has a remarkably small thickness of less than 10 μm, the reactant gas can be readily diffused in the anode 14.

For the above reasons, the unit fuel cell 36 can be obtained with the excellent power generation function.

The oxide ions reach the anode 14 and become bonded to hydrogen in the fuel gas supplied to the anode 14. As a result, water and electrons are released. The released electrons are introduced to an external circuit, which is electrically connected to the current collecting terminals 32a, 32b. The electrons are used as direct-current electrical energy for energizing the external circuit, and then become bonded to oxygen supplied to the cathode 16.

In the above reaction mechanism, since the intermediate layers 18, 20 comprise mixed conductors such as SDC, YDC, GDC, or LDC, ionization on the cathode 16 and water generation on the anode 14 are accelerated. Thus, the unit fuel cell 36 functions excellently in terms of power generation.

The MEA 10 may be produced as follows. First, a crystal of an apatite-type oxide, such as $La_xSi_6O_{1.5X+12}$, is grown such that the crystal growth direction corresponds to the c-axis direction, in order to obtain a monocrystal for the electrolyte 12. Such a crystal growth direction can be achieved by means of the method described in Japanese Laid-Open Patent Publication No. 11-130595, etc.

Then, a paste of SDC, YDC, GDC, LDC, etc., is applied to both surfaces of the monocrystal, the surfaces being perpendicular to the c-axis direction. Such application may be performed by using a known method, such as a screen printing method. The applied paste is baked so as to form the intermediate layers 18, 20.

A paste of a perovskite-type compound (such as LaSrGaMgO, LaSrMnO, or SmSrCoO), a fluorite-type compound (such as YDC, SDC, GDC, or LDC), or an apatite-type compound (such as $La_xSi_6O_{1.5X+12}$ or $La_xGe_6O_{1.5X+12}$) is applied to the intermediate layer 20 using a screen printing method, etc. The paste is baked so as to form the cathode 16.

A composite material containing the Pt and SDC particles is deposited on the intermediate layer 18. Specifically, sputtering using a Pt target and an SDC target is carried out. It is a matter of course that the Pt and SDC targets may be sputtered simultaneously or alternately.

Active substances generated from each target are attached in the particle form to the intermediate layer 18. The diameters of the particles on the intermediate layer 18 can be controlled by selecting the sputtering temperature. The above described fine particles can be obtained by sputtering at a temperature of less than 700° C.

In the first embodiment using sputtering, the grain growth of the Pt and SDC particles is suppressed. Therefore, the anode 14 is densely filled with the Pt and SDC particles (see FIG. 4). The dense anode 14 shown in FIG. 4 has a larger contact area between the anode 14 and the intermediate layer 18 as compared with the nondense anode (see FIG. 5) containing largely grown Pt and SDC particles.

The SDC content can be controlled to less than 75 vol %, for example, by applying a lower voltage to the SDC target than to the Pt target in the sputtering.

The MEA 10 (see FIG. 1) can be obtained in the foregoing manner. The MEA 10 includes an anode 14 containing Pt-SDC, an electrolyte 12 containing a monocrystal of $La_xSi_6O_{1.5X+12}$ or the like (the c-axis direction being parallel to the thickness direction), an cathode 16 containing a perovskite-type compound (such as LaSrGaMgO, LaSrMnO, or SmSrCoO), a fluorite-type compound (such as YDC, SDC, GDC, or LDC), or an apatite-type compound (such as $La_xSi_6O_{1.5X+12}$ or $La_xGe_6O_{1.5X+12}$), and intermediate layers 18, 20 containing SDC, YDC, GDC, LDC or the like interposed between the anode 14 and the electrolyte 12 and between the electrolyte 12 and the cathode 16.

The unit fuel cell 36 can be produced from the MEA 10 by disposing the separators 30a, 30b, the current collecting terminals 32a, 32b, and the end plates 34a, 34b, respectively, on surfaces of the anode 14 and the cathode 16.

Though the anode 14 is composed of Pt-SDC in the first embodiment, one or more of Group 8 metal elements of the Periodic Table may be used in the form of Ni, Pt/Co, Ni/Co, Ni/Cu, Ni/Zn, Pt/Cu, Pt/Zn, Pt/Pd, or the like, instead of Pt. The anode 14 may contain only the above metal. Also in these cases, the metal particle has a particle diameter of less than 50 nm, preferably 10 nm or less.

The electrolyte-electrode joined assembly may have only the anode 14, the electrolyte 12, and the cathode 16 without the intermediate layers 18, 20.

A specific example of the first embodiment will be described below.

A monocrystal of an apatite compound $La_{9.33}Si_6O_{26}$, oriented in the c-axis direction, was prepared by the Czochralski method. The bottom surface of the monocrystal was mirror-polished into a disc having a bottom surface diameter of 17 mm and a thickness of 300 μm (size in the thickness direction parallel to the c-axis direction). Then, a 100-nm-thick SDC ($Sm_{0.8}Ce_{0.2}O_2$) layer was formed on each surface of the disc by sputtering, and the resultant disc was subjected to heat treatment at 1200° C. for 2 hours in air.

A paste of $La_{0.5}Sr_{0.5}Co_{0.8}Fe_{0.2}O_3$ was applied into a diameter of 8 mm to the surface of one of the SDC layers by screen printing, and subjected to heat treatment at 1100° C. for 1 hour in the air, so as to form an $La_{0.5}Sr_{0.5}Co_{0.8}Fe_{0.2}O_3$ layer.

A Pt target and an SDC ($Sm_{0.8}Ce_{0.2}O_2$) target were simultaneously sputtered to form a 200-nm-thick Pt-SDC layer on the surface of the other SDC layer. The Pt-SDC layer was subjected to heat treatment at 500° C. for 2 hours. The resultant Pt-SDC layer contained 25 to 50 vol % of the SDC, and the Pt and SDC particles in the layer had a particle diameter of less than 50 nm.

The MEA of Example 1, which had an electrolyte of $La_{9.33}Si_6O_{26}$, an anode made up of the Pt-SDC layer, a cathode made up of the $La_{0.5}Sr_{0.5}Co_{0.8}Fe_{0.2}O_3$ layer, and intermediate SDC layers interposed between the electrolyte and the anode and between the electrolyte and the cathode, was obtained in the foregoing manner.

The MEAs of Examples 2 to 11 were produced in the same manner as Example 1 except for using the materials and thicknesses of the intermediate layer and the anode shown in FIG. 6.

The MEA of Example 12 was produced by using a cathode formed by sputtering as well as the anode.

For comparison, the MEAs of Comparative Examples 1 and 2 each having the anode and intermediate layer shown in FIG. 6 were produced in the same manner as above except that the anode having a Pt particle diameter of more than 50 nm was formed by sputtering.

Furthermore, the MEAs of Comparative Examples 3 to 8 each having the anode and intermediate layer shown in FIG. 6 were produced in the same manner as above except that the anode having a thickness of 10 μm was formed by sintering.

A unit fuel cell was produced using each of the MEAs of Examples 1 to 12 and Comparative Examples 1 to 8. $H_2$ was supplied to the anode at a flow rate of 15 cc/minute, and a compressed air was supplied to the cathode at a flow rate of 100 cc/minute, to produce electric power. The maximum outputs of the unit fuel cells at 500° C. and 300° C. are shown in FIG. 6.

It is clear from the comparison of the maximum outputs at 500° C. and 300° C. that the unit fuel cells of Examples 1 to 12 are more excellent in power generation function than the cells of Comparative Examples 1 to 5. It is presumed that this was because the Pt particles in the anode had a small particle diameter of less than 50 nm, and therefore the contact area between the Pt particles and the intermediate layer was increased, whereby the anode could readily accept oxide ions moving through the intermediate layer.

Next, an electrolyte-electrode joined assembly (MEA) according to a second embodiment will be described below.

Figure 7:
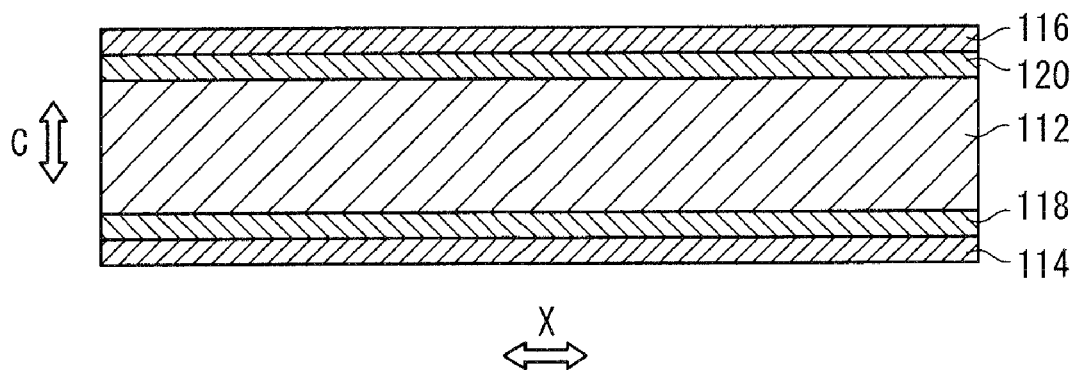
FIG. 7 is an overall, schematic, longitudinal sectional view of an electrolyte-electrode joined assembly according to a second embodiment.

FIG. 7 is an overall, schematic, longitudinal sectional view showing an MEA 110 according to the second embodiment. The MEA 110 is produced by forming an anode 114 and a cathode 116 on surfaces of an electrolyte 112, respectively. Intermediate layers 118, 120 are disposed between the anode 114 and the electrolyte 112 and between the cathode 116 and the electrolyte 112, respectively.

In this embodiment, a monocrystal of an apatite-type composite oxide (e.g., $La_X Si_6 O_{1.5X+12}$ in FIG. 2) is used as the electrolyte 112. Also in the electrolyte 112, the c-axis direction of the monocrystal corresponds to the thickness direction (the direction of the arrow C shown in FIG. 7).

In the electrolyte 112, the surface roughness of each surface facing the intermediate layers 118, 120 is not particularly limited. In general, the surface roughness has an arithmetic average height Ra of 2 nm to 5 μm in accordance with JIS B 0601 (2001).

The thickness of the electrolyte 112 is 800 μm or less, preferably 50 to 300 μm. In a case where a substrate-supported-type electrolyte-electrode joined assembly, in which the electrolyte 112 is supported by a supporting substrate, is used, the electrolyte 112 can have a remarkably small thickness. In this case, oxide ions can be readily transferred through the electrolyte 112 to the anode 114, and the IR loss of the electrolyte 112 can be reduced. In the substrate-supported-type electrolyte-electrode joined assembly, the thickness of the electrolyte 112 is more preferably 50 nm to 10 μm. The electrolyte 112 has a sufficient strength even with such a thickness.

The electrolyte 112 preferably has a conductivity of 0.01 S/cm at 500° C. in the thickness direction (the direction of the arrow C in FIG. 7), as measured by a direct-current 4-terminal method as well as the electrolyte 12. The electrolyte 112 more preferably has a conductivity of 0.001 S/cm at 300° C. Furthermore, the electrolyte 112 preferably has a conductivity of 0.1 S/cm, more preferably has a conductivity of 0.3 S/cm, at 700° C.

In this case, the anode 114 is a mixed conductor of a Pt-SDC. When the anode 114 is observed using an SEM or the like, Pt particles and SDC particles joined to each other and pores formed between the particles are observed.

In the second embodiment, the ratio of the SDC to the total of the Pt and SDC is 75 vol % or less. When the SDC ratio is more than 75 vol %, the anode 114 is insufficient in the electron conductivity.

In a case where the anode 114 is formed by a gas phase method such as a sputtering, CVD, ALD, or PLD method, the thickness of the anode 114 is controlled at approximately 50 nm to 1 μm. In this case, the anode 114 has a porosity of about 30 vol %. The anode 114 may be formed by firing a paste, and in this case the thickness is controlled at approximately less than 10 μm.

Though the cathode 116 may be composed of the same material as the anode 114, the cathode 116 more preferably contains an oxide ceramic such as $La_X Sr_{1-X} Co_Y Fe_{1-Y} O_\alpha$, $Ba_X Sr_{1-X} Co_Y Fe_{1-Y} O_\alpha$, or $Sm_X Sr_{1-X} CoO_\alpha$ in the same manner as the cathode 16 of the first embodiment. Alternatively, the cathode 116 may contain a cermet of the oxide ceramic and the above metal.

The materials and functions of the intermediate layers 118, 120 of the second embodiment are similar to those of the intermediate layers 18, 20 of the first embodiment, and the detailed descriptions thereof are thus omitted.

Figure 8:
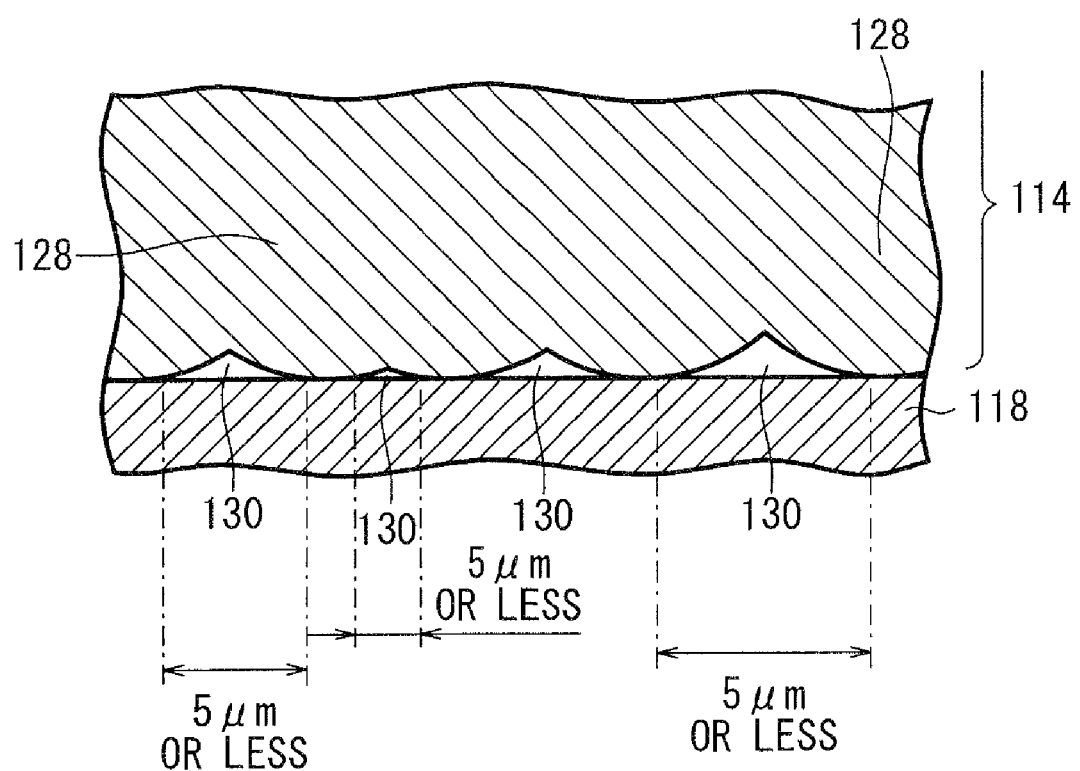
FIG. 8 is a schematic, enlarged, structural explanatory view showing a surrounding area of an interface between an anode and an intermediate layer in the electrolyte-electrode joined assembly of FIG. 7.

A surrounding area of an interface between the anode 114 and the intermediate layer 118 is schematically shown in FIG. 8. The anode 114 contains particles 128 shown in FIG. 8.

As shown in FIG. 8, the anode 114 has a plurality of pores 130 on the surface facing the intermediate layer 118. Thus, the particles 128 are microscopically held in point and surface contacts with the intermediate layer 118, so that the anode 114 is connected to the intermediate layer 118.

In this embodiment, as shown in FIG. 8, the gap distance between connection portions facing each other across the pore 130 is 5 μm or less. The gap distance means a distance between points at which the particles 128 are firstly brought into contact with the intermediate layer 118.

Thus, in the second embodiment, the particles 128 in the anode 114 are in dense contact with the intermediate layer 118. Therefore, the anode 114 can widely accept the electrons transferred from the electrolyte 112 through the intermediate layer 118. In other words, the MEA 110 of the second embodiment has a significantly low interface resistance between the anode 114 and the intermediate layer 118.

In a case where the anode 114 and the electrolyte 112 are stacked directly without the intermediate layer 118, they have a relatively high interface resistance therebetween, and oxide ions cannot readily move from the electrolyte 112 to the anode 114. Presumably, this is because when the electrolyte 112 has anisotropic oxide ion conductivity and the pore 130 is in a position corresponding to the C-axis, the anode 114 cannot accept the oxide ions conducted along the C-axis as described in Patent Document 2.

In the case of using the intermediate layer 118, oxide ions randomly move in the intermediate layer 118 because of the isotropic oxide ion conductivity thereof. As a result, the oxide ions can reach the particles 128 in the anode 114 at a higher rate, and the anode 114 can readily accept the oxide ions, whereby the interface resistance is greatly lowered.

The interface resistance is lowered generally by increasing the thickness of the intermediate layer 118. In contrast, in the second embodiment, the interface resistance between the anode 114 and the intermediate layer 118 is lowered by bringing the particles 128 in the anode 114 into dense contact with the intermediate layer 118 so as to increase the probability that oxide ions reach the particles 128 as described above. Therefore, the intermediate layer 118 can have a small thickness in this embodiment.

Of course, this is true for the relation between the cathode 116 and the intermediate layer 120.

The thickness of each of the intermediate layers 118, 120 is 2 to 250 times as large as the arithmetic average height Ra of the electrolyte 112. When the thickness is less than 2 times of the Ra, the anode 114 or cathode 116 cannot be easily covered with the intermediate layer 118, 120, and the contact distance between the intermediate layer 118, 120 and the anode 114 or cathode 116 is increased, and as a result, such a intermediate layer 118, 120 is less effective in reducing the interface resistance. When the thickness is more than 250 times of the Ra, the intermediate layer 118, 120 has a high resistance because of the large thickness.

As described above, the electrolyte 112 generally has an arithmetic average height Ra of 2 nm to 5 μm. In this case, each of the intermediate layers 118, 120 preferably has a thickness of 5 μm or less, generally 50 nm to 1 μm. Though the resistivity of the intermediate layer 118, 120 is higher than that of the electrolyte 112, the resistance of the intermediate layer 118, 120 can be lowered by controlling the thickness in relation to the surface roughness (the arithmetic average height Ra) of the electrolyte 112. In other words, the IR loss can be reduced.

The thickness of each of the intermediate layers 118, 120 is more preferably 500 nm or less, even more preferably 50 to 200 nm. The IR loss can be further reduced by using such a remarkably small thickness.

The overall thickness of the MEA 110 is preferably at least 50 μm and at most 1 mm, most preferably 200 to 600 μm, for the same reason as the first embodiment.

Figure 9:
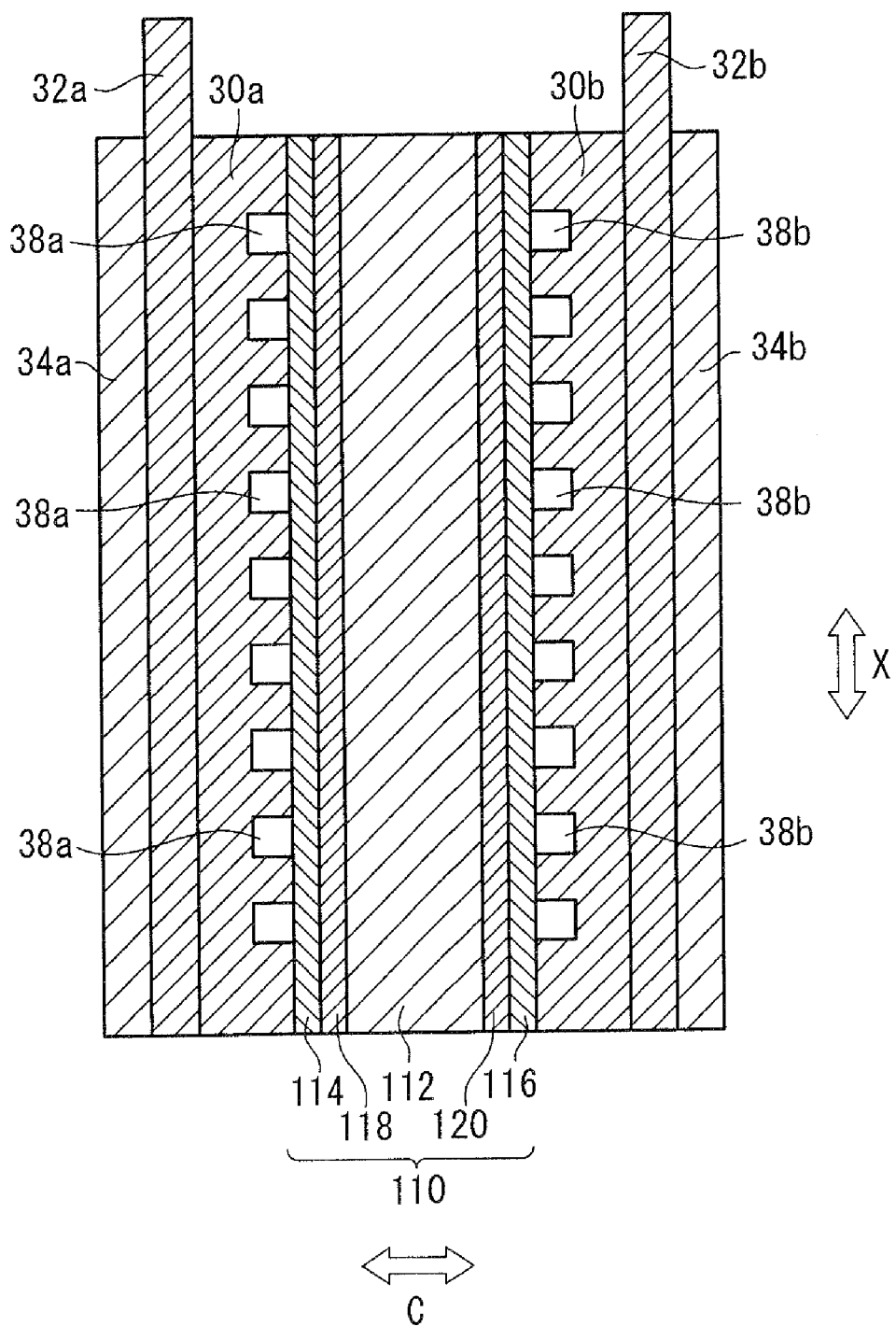
FIG. 9 is a schematic, longitudinal sectional view showing a unit fuel cell having the electrolyte-electrode joined assembly of FIG. 7.

In the case of forming a unit fuel cell, the MEA 110 is interposed between a pair of separators 30a, 30b as shown in FIG. 9 in the same manner as the first embodiment. Current collecting terminals 32a, 32b are disposed outside the separators 30a, 30b, respectively, and end plates 34a, 34b are disposed outside the current collecting terminals 32a, 32b, respectively. The end plates 34a, 34b are connected to each other by bolts (not shown). In the foregoing manner, the MEA 110, the separators 30a, 30b, and the current collecting terminals 32a, 32b are sandwiched by the end plates 34a, 34b, to form the unit fuel cell 136.

Gas passages 38a, 38b shown in FIG. 9 are formed in the separators 30a, 30b for supplying fuel gas and oxygen-containing gas to the anode 114 and the cathode 116, respectively.

The unit fuel cell 136 is operated after heated to a low through medium temperature of approximately 300° C. to 700° C., preferably 500° C. Thus, after the heating, the oxygen-containing gas is supplied through the gas passages 38b in the separator 30b, while the hydrogen-containing fuel gas is supplied through the gas passages 38a in the separator 30a.

Then, oxide ions ($O^{2-}$) are generated in the cathode 116 by the same mechanism as the first embodiment. As schematically shown in FIG. 10, the generated oxide ions are transferred from the cathode 116 to the intermediate layer 120, from the intermediate layer 120 to the electrolyte 112, and further from the electrolyte 112 through the intermediate layer 118 to the anode 114.

Also in this embodiment, by interposing the intermediate layers 120, 118 composed of the isotropic oxide ion-conductive material between the cathode 116 and the electrolyte 112 and between the electrolyte 112 and the anode 114, respectively, the numbers of the oxide ions transferred from the cathode 116 to the electrolyte 112 and the oxide ions transferred from the electrolyte 112 to the anode 114 are increased, thereby to improve the oxide ion conductivity.

In addition, in this embodiment, the particles 128 in the anode 114 are in dense contact with the intermediate layer 118. Thus, the oxide ions transferred to the intermediate layer 118 move to the pores 130 in the anode 114 at a lower rate, and to the particles 128 at a higher rate. As a result, the interface resistance between the anode 114 and the intermediate layer 118 is greatly lowered.

As described above, in the second embodiment, the interface resistances between the electrodes 114, 116 and the intermediate layers 118, 120 are lowered, whereby the overvoltage is reduced. The MEA 110 has a high oxide ion conductivity, whereby the unit cell 136 (fuel cell) is excellent in power generation function.

In the power generation reaction mechanism of the fuel cell, the ionization reaction on the cathode 116 and the water generation reaction on the anode 114 are accelerated by the mixed conductor such as SDC, YDC, GDC, or LDC of the intermediate layers 118, 120. Thus, the unit fuel cell 136 is further excellent in power generation function.

The MEA 110 may be produced as follows. First, a single crystal of an apatite-type oxide such as $La_XSi_6O_{1.5X+12}$ is grown such that the crystal growth direction corresponds to the c-axis direction, in order to obtain a monocrystal for the electrolyte 112. Such a crystal growth direction can be achieved by a method described in Japanese Laid-Open Patent Publication No. 11-130595, etc.

Then, both surfaces of the monocrystal that are perpendicular to the c-axis direction, are subjected to a polishing treatment such as a mirror polishing treatment, a fine polishing treatment, or a stone polishing treatment, whereby the arithmetic average heights Ra of the surfaces are controlled at a predetermined value.

The intermediate layers 118, 120 are disposed on the polished surfaces, respectively. In this embodiment, the intermediate layers 118, 120 are preferably formed by a gas phase method to obtain the thickness of at most 5 μm. For example, the intermediate layers 118, 120 are formed by sputtering using a SDC, YDC, GDC, or LDC target, etc.

Fine active substances generated from the target are attached in the particle form to one surface of the monocrystal. The particles are deposited also on the other surface, and the monocrystal with the particles are subjected to heat treatment. Then, the particles are joined to each other so as to form the intermediate layers 118, 120.

A paste of a perovskite-type compound (such as LaSrGaMgO, LaSrMnO, or SmSrCoO), a fluorite-type compound (such as YDC, SDC, GDC, or LDC), or an apatite-type compound (such as $La_XSi_6O_{1.5X+12}$ or $La_XGe_6O_{1.5X+12}$) is applied to the intermediate layer 120 by a screen printing method, etc. The paste is baked to form the cathode 116.

Next, a composite material containing Pt and SDC particles is deposited on the intermediate layer 118. The particles may be deposited, for example, by sputtering using Pt and SDC targets. The Pt and SDC targets are sputtered simultaneously in this embodiment.

Active substances generated from each target are attached in the particle form to the intermediate layer 118. The attached particles are subjected to heat treatment and thereby are grain-grown into the above particles 128, thereby to form the anode 114 containing the particles 128 in dense contact with the intermediate layer 118.

By selecting the sputtering conditions, the particle diameter of the grown particles 128 can be controlled to less than 50 nm, and thus the gap distance between the pores 130, 130 can be controlled to 5 μm or less. When the particles 128 in the anode 114 have such a small size, the oxide ions transferred to the intermediate layer 118 can reach the particles 128 at an even higher rate.

For example, the SDC content can be controlled to 75 vol % or less by applying a lower voltage to the SDC target than to the Pt target in the sputtering.

The MEA 110 (see FIG. 7) can be obtained in the foregoing manner. The MEA 110 has an anode 114 containing Pt-SDC, the electrolyte 112 containing the monocrystal of $La_XSi_6O_{1.5X+12}$ or the like (the c-axis direction being parallel to the thickness direction), the cathode 116 containing a perovskite-type compound (such as LaSrGaMgO, LaSrMnO, or SmSrCoO), a fluorite-type compound (such as YDC, SDC, GDC, or LDC), or an apatite-type compound (such as $La_XSi_6O_{1.5X+12}$ or $La_XGe_6O_{1.5X+12}$), and the intermediate layers 118, 120 containing SDC, YDC, GDC, LDC or the like interposed between the anode 114 and the electrolyte 112 and between the electrolyte 112 and the cathode 116.

The unit fuel cell 136 can be produced from the MEA 110 by disposing the separators 30a, 30b, the current collecting terminals 32a, 32b, and the end plates 34a, 34b on the surfaces of the anode 114 and the cathode 116, respectively.

In the second embodiment, one or more of Group 8 metal elements of the Periodic Table may be used in the form of Ni, Pt/Co, Ni/Co, Pt/Pd, or the like instead of Pt in the Pt-SDC for the anode 114. The anode 114 may contain only the above metal. Also in these cases, the metal particle has a particle diameter of less than 50 nm.

In the first and second embodiments, the electrolyte-electrode joined assembly may be a substrate-supported-type electrolyte-electrode joined assembly, in which the electrolyte 12, 112 is supported on a supporting substrate. In this case, the electrolyte 112 can have a thickness of 50 μm or less. From the viewpoint of the relation between the power generation function and strength of the assembly, it is preferred that the electrolyte 112 should have a thickness of 50 nm to 10 μm.

A specific example of the second embodiment will be described below.

A monocrystal of an apatite compound $La_{9.33}Si_6O_{26}$, oriented in the c-axis direction, was prepared by the Czochralski method. The bottom surface of the monocrystal was mirror-polished into a disc having a bottom surface diameter of 17 mm, an arithmetic average height Ra of 2 nm in the bottom surface, and a thickness of 300 μm (size in the thickness direction parallel to the c-axis direction). Then, a 200-nm-thick SDC ($Sm_{0.8}Ce_{0.2}O_2$) layer was formed on each surface of the disc by sputtering, and the resultant disc was subjected to heat treatment at 1200° C. for 2 hours in air.

A paste of $La_{0.5}Sr_{0.5}Co_{0.8}Fe_{0.2}O_3$ was applied into a diameter of 8 mm to the surface of one of the SDC layers by screen printing, and subjected to a heat treatment at 1100° C. for 1 hour in the air, to form an $La_{0.5}Sr_{0.5}Co_{0.8}Fe_{0.2}O_3$ layer.

A Pt target and an SDC ($Sm_{0.8}Ce_{0.2}O_2$) target were simultaneously sputtered to form a 200-nm-thick Pt-SDC layer on the surface of the other SDC layer. The Pt-SDC layer was subjected to a heat treatment at 500° C. for 2 hours. The resultant Pt-SDC layer contained 75 vol % of the Pt.

The MEA of Example 13, which had the electrolyte of $La_{9.33}Si_6O_{26}$, the anode of Pt-SDC layer, the cathode of $La_{0.5}Sr_{0.5}Co_{0.8}Fe_{0.2}O_3$ layer, and the intermediate SDC layers interposed between the electrolyte and the anode and between the electrolyte and the cathode, was produced in this manner. As a result of observation using an SEM, the average distance between the connection portions of the particles in the anode was 20 nm. Meanwhile the average distance between the connection portions of the particles in the cathode was 500 nm.

The MEAs of Examples 14 to 21 were produced in the same manner as Example 12 except for using the materials and thicknesses of the intermediate layer and the anode or cathode as shown in FIG. 11. In FIG. 11, for example, a Pt-SDC layer containing 75 vol % of Pt is represented by "75% Pt-SDC".

The MEA of Example 22, which had an electrolyte arithmetic average height Ra of 400 nm and an electrolyte thickness of 500 μm, and contained the anode, cathode, and two intermediate layers shown in FIG. 11, was produced by carrying out a fine polishing treatment instead of the mirror polishing treatment. In Example 22, the average distances between the connection portions of the particles in the anode and cathode were 5 μm and 500 nm, respectively.

The MEA of Example 23, which had an electrolyte arithmetic average height Ra of 2 μm and an electrolyte thickness of 500 μm, and contained the anode, cathode, and two intermediate layers shown in FIG. 11, was produced by carrying out a #600 abrasive grain polishing treatment. In Example 23, the average distances between the connection portions of the particles in the anode and cathode were 5 μm and 500 nm, respectively.

For comparison, the MEA of Comparative Example 9 having an electrolyte arithmetic average height Ra of 400 nm and an intermediate layer thickness of 100 nm was produced. Thus, in the MEA, the thickness of the intermediate layer was smaller than the arithmetic average height Ra of the electrolyte.

Furthermore, the MEA of Comparative Example 10 having no intermediate layers was produced.

A unit fuel cell was produced using each of the MEAs of Examples 13 to 23 and Comparative Examples 9 and 10. $H_2$ was supplied to the anode at a flow rate of 15 cc/minute, and a compressed air was supplied to the cathode at a flow rate of 100 cc/minute, to produce electric power. The output powers of the unit fuel cells at 500° C. are shown in FIG. 11.

It is clear from the comparison of the output voltages at 500° C. that the unit fuel cells of Examples 13 to 23 are more excellent in power generation function than the cells of Comparative Examples 9 and 10. This is presumed because the thickness of the intermediate layer was 2 to 250 times as large as the arithmetic average roughness Ra of the electrolyte and was 1/10000 to 1/50 of the thickness of the electrolyte, whereby the interface resistance and the IR loss of the intermediate layer were reduced.

Next, a third embodiment will be described below with a focus on a gap distance between particles.

Figure 12:
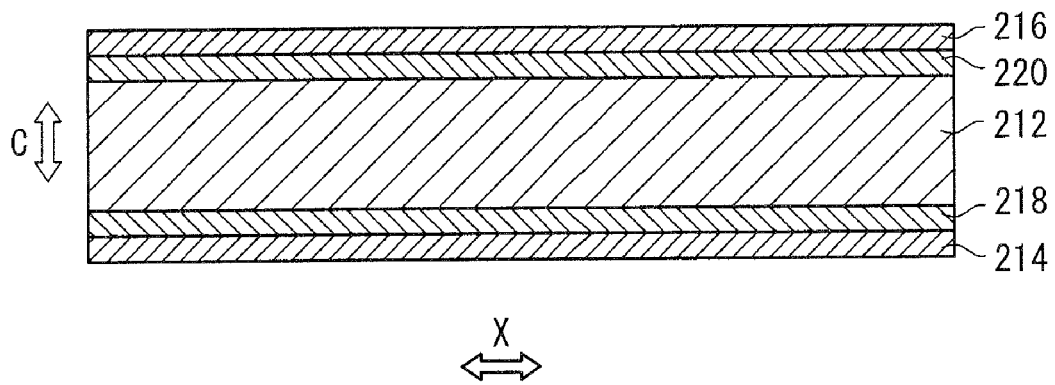
FIG. 12 is an overall, schematic, longitudinal sectional view of an electrolyte-electrode joined assembly according to a third embodiment.

FIG. 12 is an overall, schematic, longitudinal sectional view of an MEA 210 according to the third embodiment. The MEA 210 is produced by forming an anode 214 and a cathode 216 on surfaces of an electrolyte 212. Intermediate layers 218, 220 are disposed between the anode 214 and the electrolyte 212 and between the cathode 216 and the electrolyte 212, respectively.

As with the electrolytes 12, 112, the electrolyte 212 is a monocrystal of an apatite-type composite oxide (e.g. $La_xSi_6O_{1.5X+12}$ shown in FIG. 2), and the c-axis direction of the monocrystal corresponds to the thickness direction (the direction of the arrow C in FIG. 12).

The thickness of the electrolyte 212 is 800 μm or less, preferably 50 to 300 μm. In a case where a substrate-supported-type electrolyte-electrode joined assembly, in which the electrolyte 212 is supported by a supporting substrate, is used, the electrolyte 212 can have a remarkably small thickness. In this case, oxide ions can readily move through the electrolyte 212 to the anode 214, and the IR loss of the electrolyte 212 can be reduced. In the substrate-supported-type electrolyte-electrode joined assembly, the thickness of the electrolyte 212 is more preferably 50 nm to 10 μm. The electrolyte 212 has a sufficient strength even with such a thickness.

As with the electrolytes 12, 112, the electrolyte 212 preferably has a conductivity of 0.01 $S/cm^2$ at 500° C. and more preferably a conductivity of 0.001 $S/cm^2$ at 300° C., as measured by a direct-current 4-terminal method. The conductivities are measured in the c-axis direction, i.e. the thickness direction of the electrolyte 212 (the direction of the arrow C in FIG. 12).

The anode 214 is composed of the mixed conductor of the Pt-SDC, as with the anodes 14, 114, and is generally formed by a gas phase method such as a sputtering, CVD, ALD, or PLD method. When the anode 214 is observed using an SEM or the like, Pt particles and SDC particles joined to each other and pores formed between the particles are observed.

In this embodiment, the ratio of the SDC to the total of the Pt and SDC is less than 75 vol %. When the SDC ratio is more than 75 vol %, the anode 214 has insufficient electron conductivity.

The thickness of the anode 214 formed by the above gas phase method is set to be approximately 50 nm to several hundreds nm and at most 1 μm. In this case, the porosity of the anode 214 is about 5 to 40 vol %, typically about 30 vol %.

Though the cathode 216 may be composed of the same material as the anode 214, the cathode 216 more preferably contains an oxide ceramic such as $La_XSr_{1-X}Co_YFe_{1-Y}O_\alpha$, $Ba_XSr_{1-X}Co_YFe_{1-Y}O_\alpha$, or $Sm_XSr_{1-X}CoO_\alpha$, as the cathodes 16, 116. Alternatively, the cathode 216 may contain a cermet of the oxide ceramic and the above metal.

The materials and functions of the intermediate layers 218, 220 are similar to those of the intermediate layers 18, 118, 20, 120, and thus, the detailed descriptions thereof are omitted.

Figure 13:
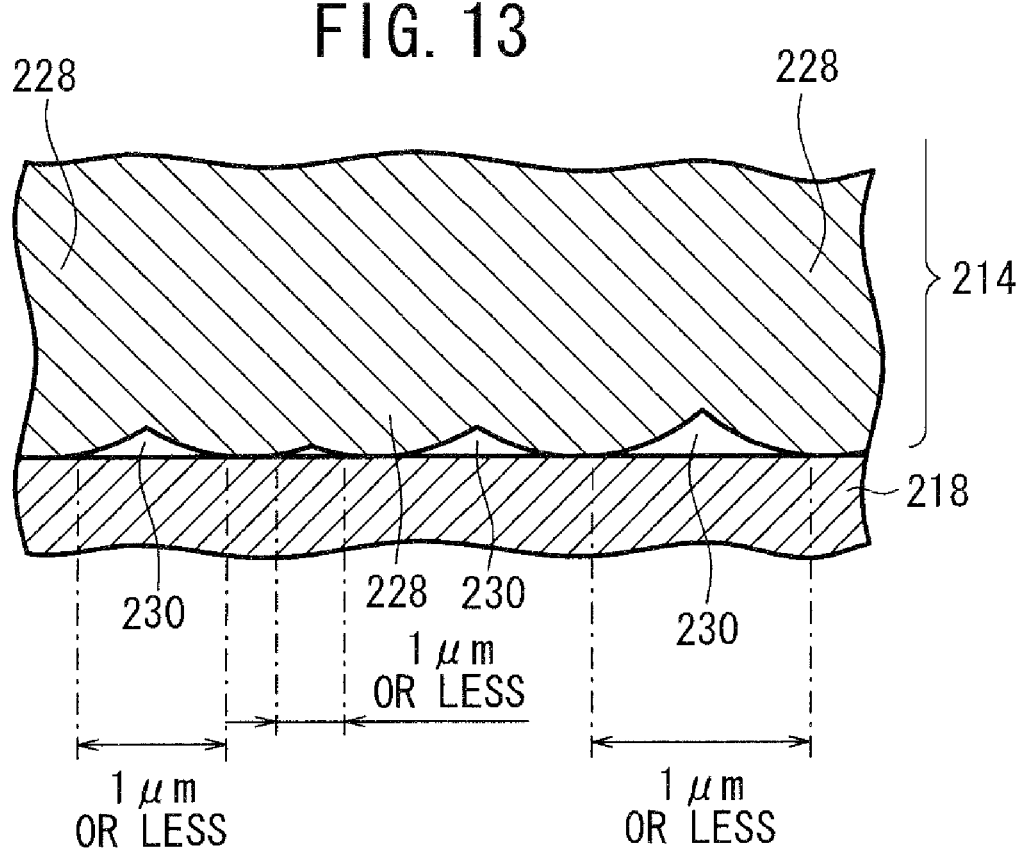
FIG. 13 is a schematic, enlarged, structural explanatory view showing a surrounding area of an interface between an anode and an intermediate layer in the electrolyte-electrode joined assembly of FIG. 12.

A surrounding area of an interface between the anode 214 and the intermediate layer 218 is schematically shown in FIG. 13. The anode 214 contains particles 228 shown in FIG. 13. Each of the particles 228 may be an SDC or Pt particle. In an X-ray diffraction measurement of the anode 214, broad peaks are observed in the diffraction pattern. Thus, the particles 228 in the anode 214 are in an amorphous state.

As shown in FIG. 13, the anode 214 has a plurality of pores 230 between the particles 228 on the surface facing the intermediate layer 218. Thus, the particles 228 are microscopically held in point and surface contacts with the intermediate layer 218, so that the anode 214 is connected to the intermediate layer 218.

The particles 228 have a particle diameter of 100 nm or less. Such fine particles 228 are in dense contact with each other and also with the intermediate layer 218 (or the electrolyte 212), so that the anode 214 has a small porosity.

In the third embodiment, as shown in FIG. 13, the gap distance between connection portions facing each other across the pore 230 is 1 μm or less. The gap distance is more preferably 0.5 μm or less, even more preferably 0.1 μm or less. The gap distance means a distance between points at which the particles 228 are firstly brought into contact with the intermediate layer 218.

In the third embodiment, the particles 228 in the anode 214 are densely in contact with the intermediate layer 218. In addition, the anode 214 has a relatively small porosity of 5 to 40 vol % as described above. Thus, the number of the particles 228 is larger than that of the pores 230 in the vicinity of the interface between the anode 214 and the intermediate layer 218. As a result, the anode 214 can widely accept the electrons transferred from the electrolyte 212 through the intermediate layer 218.

Furthermore, oxide ions randomly move in the intermediate layer 218 because of the isotropic oxide ion conductivity. The oxide ions move to the pores 230 in the anode 214 at a lower rate, and to the particles 228 at a higher rate. As a result, the anode 214 can readily accept the oxide ions, whereby the interface resistance is lowered. Thus, the MEA 210 of the third embodiment has a significantly low interface resistance between the anode 214 and the intermediate layer 218.

In order to reduce the interface resistance, generally the thickness of the intermediate layer 218 is increased. In contrast, in the third embodiment, the interface resistance between the anode 214 and the intermediate layer 218 is lowered by bringing the particles 228 in the anode 214 densely into contact with the intermediate layer 218 and by reducing the porosity of the anode 214 thereby to increase the probability that the oxide ions reach the particles 228 of the anode 214, as described above. Therefore, the intermediate layer 218 can have a small thickness in this embodiment.

Furthermore, the MEA 210 having the anode 214 containing amorphous Pt particles is more excellent in power generation function than MEAs having an anode showing a sharp Pt particle peak in the X-ray diffraction measurement.

Of course, this is true for the relation between the cathode 216 and the intermediate layer 220.

The thickness of each of the intermediate layers 218, 220 may be 1 μm or less, and more preferably 500 nm or less, even more preferably 50 to 200 nm. The IR loss can be further reduced by using such a remarkably small thickness.

The MEA 210 has such an overall thickness suitable for ensuring sufficient strength. Specifically, the overall thickness may be at most 1 mm. When the thickness is more than 1 mm, the MEA 210 has a large volume, resulting in poor energy efficiency per volume.

The overall thickness of the MEA 210 is preferably at least 100 μm and at most 1 mm, most preferably 200 to 600 μm, for the same reason as the first and second embodiments.

Figure 14:
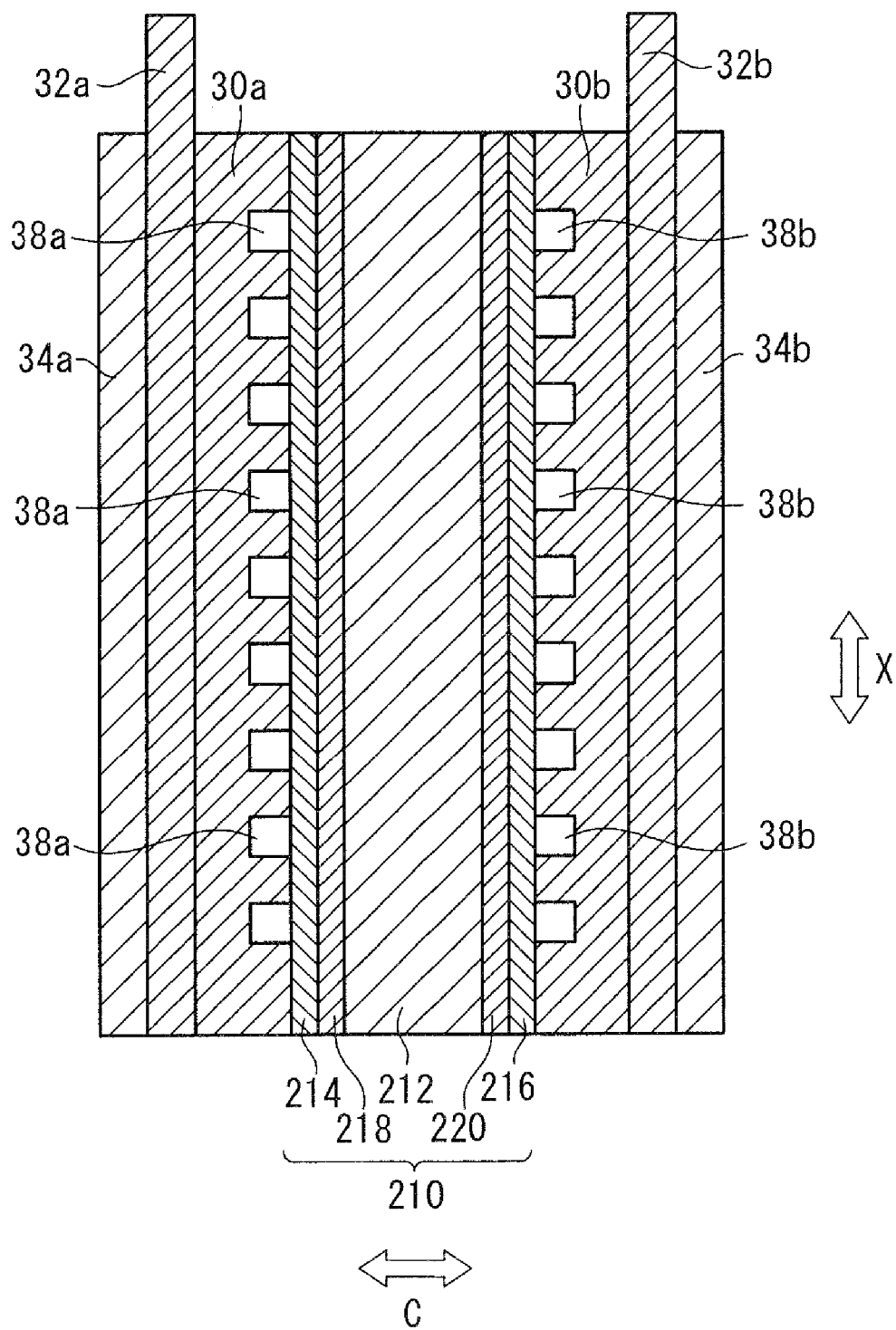
FIG. 14 is a schematic, longitudinal sectional view of a unit fuel cell having the electrolyte-electrode joined assembly of FIG. 12.

In the case of forming a unit fuel cell, the MEA 210 is interposed between a pair of separators 30a, 30b having gas passages 38a, 38b as shown in FIG. 14 in the same manner as the first and second embodiments. Current collecting terminals 32a, 32b are disposed outside the separators 30a, 30b, respectively, and end plates 34a, 34b are disposed outside the current collecting terminals 32a, 32b, respectively. The end plates 34a, 34b are connected to each other by bolts (not shown), whereby the MEA 210, the separators 30a, 30b, and the current collecting terminals 32a, 32b are sandwiched by the end plates 34a, 34b, to form the unit fuel cell 236.

The unit fuel cell 236 is operated after heated to a low through medium temperature of approximately 300° C. to 700° C., preferably 500° C. Thus, after the heating, an oxygen-containing gas is supplied through the gas passages 38b in the separator 30b, while a hydrogen-containing fuel gas is supplied through the gas passages 38a in the separator 30a.

Figure 15:
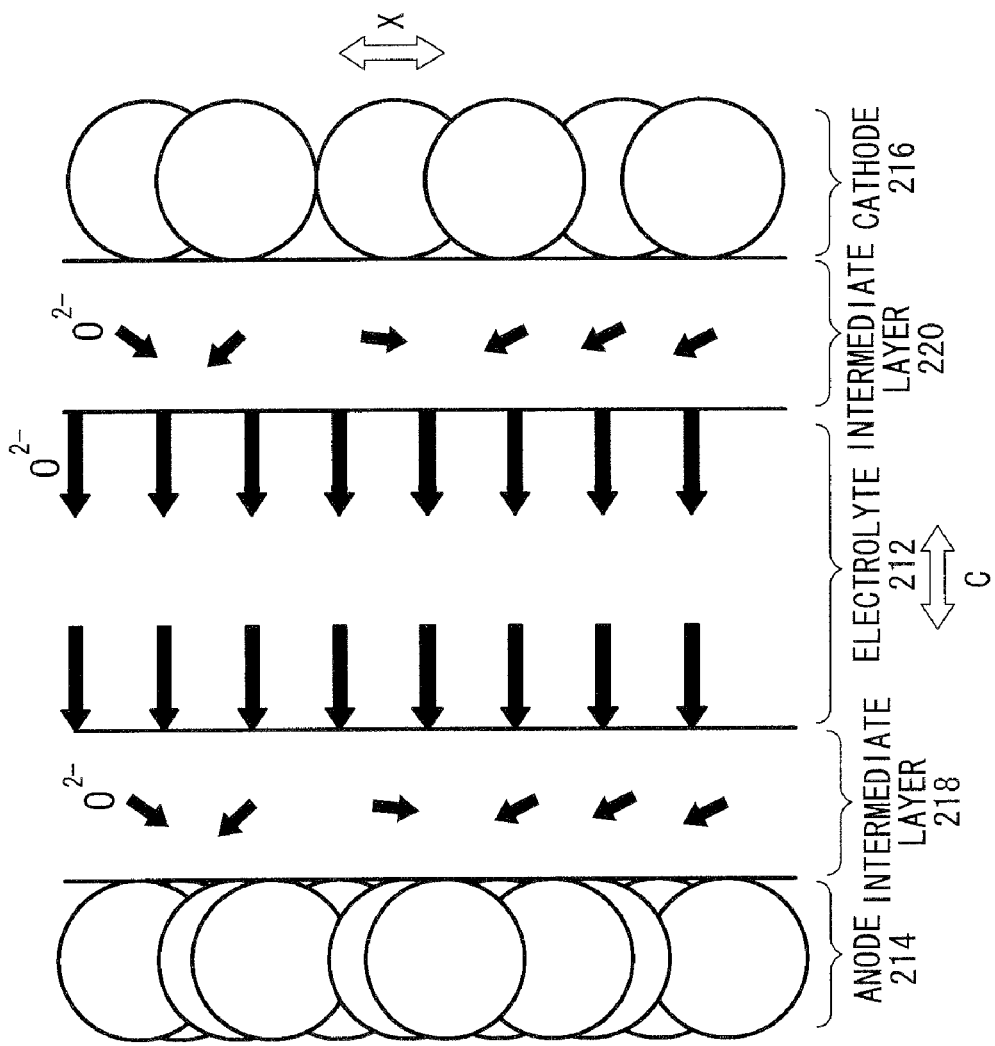
FIG. 15 is a schematic, structural explanatory view showing the electrolyte-electrode joined assembly of FIG. 12.

Oxygen in the oxygen-containing gas is bonded to electron in the cathode 216 to generate an oxide ion ($O^{2-}$). As schematically shown in FIG. 15, the generated oxide ion is transferred from the cathode 216 to the intermediate layer 220, from the intermediate layer 220 to the electrolyte 212, and further from the electrolyte 212 through the intermediate layer 218 to the anode 214.

Also in this embodiment, by interposing the intermediate layers 220, 218 composed of the isotropic oxide ion-conductive material between the cathode 216 and the electrolyte 212 and between the electrolyte 212 and the anode 214, respectively, the numbers of the oxide ions transferred from the cathode 216 to the electrolyte 212 and the oxide ions transferred from the electrolyte 212 to the anode 214 are increased, thereby improving the oxide ion conductivity.

In addition, in this embodiment, the particles 228 in the anode 214 are densely in contact with the intermediate layer 218. Thus, the oxide ions transferred to the intermediate layer 218 move to the pores 230 in the anode 214 at a lower rate, and to the particles 228 at a higher rate. As a result, the interface resistance between the anode 214 and the intermediate layer 218 is greatly lowered.

As described above, in the third embodiment, the interface resistances between the electrodes 214, 216 and the intermediate layers 218, 220 are lowered thereby to reduce the overvoltage. The MEA 210 has a high oxide ion conductivity, whereby the unit cell 236 (fuel cell) is excellent in power generation function.

The oxide ion finally reaches the anode 214 and is bonded to hydrogen in the fuel gas supplied to the anode 214. As a result, water and electrons are released. Since the anode 214 has a small thickness of at most 1 μm, the fuel gas (the reactant gas) is readily diffused in the anode 214. Thus, the electrode reaction proceeds efficiently.

The released electrons are extracted to an external circuit electrically connected to the current collecting terminals 32a, 32b. The extracted electrons are used as a direct-current electrical energy for energizing the external circuit. Thereafter, the electrons are introduced to the cathode 216, and bonded to oxygen supplied to the cathode 216.

In the above reaction mechanism, the ionization reaction in the cathode 216 and the water generation reaction in the anode 214 are accelerated by the mixed conductor such as SDC, YDC, or GDC of the intermediate layers 218, 220. Furthermore, the anode 214 has a low internal resistance because of the small thickness. Thus, the unit fuel cell 236 is more excellent in power generation function.

The MEA 210 may be produced as follows. First, a crystal of an apatite-type oxide such as $La_xSi_6O_{1.5X+12}$ is grown such that the crystal growth direction corresponds to the c-axis direction, to obtain a monocrystal for the electrolyte 212. Such a crystal growth direction can be achieved by a method described in Japanese Laid-Open Patent Publication No. 11-130595, for example.

Then, both surfaces of the monocrystal, perpendicular to the c-axis direction, are subjected to a polishing treatment such as a mirror polishing treatment, a fine polishing treatment, or a stone polishing treatment, whereby the arithmetic average heights Ra of the surfaces are controlled at a predetermined value.

The intermediate layers 218, 220 are disposed on the polished surfaces. In the third embodiment, the intermediate layers 218, 220 are preferably formed by the gas phase method to obtain the thickness of at most 1 For example, the intermediate layers 218, 220 are formed by sputtering using a SDC, YDC, GDC, or LDC target, etc.

Fine active substances generated from the target are attached in the particle form to one surface of the monocrystal. The particles are deposited also on the other surface, and the monocrystal with the particles are subjected to heat treatment. Then, the particles are joined to each other to form the intermediate layers 218, 220.

A paste of a perovskite-type compound (such as LaSrGaMgO, LaSrMnO, or SmSrCoO), a fluorite-type compound (such as YDC, SDC, GDC, or lanthanum-doped ceria, i.e., LDC), or an apatite-type compound (such as $La_xSi_6O_{1.5X+12}$ or $La_xGe_6O_{1.5X+12}$) is applied to the intermediate layer 220 by a screen printing method, etc. The paste is baked to form the cathode 216.

A composite material containing Pt and SDC particles is deposited on the intermediate layer 218. The particles may be deposited, for example, by sputtering using Pt and SDC targets. The Pt and SDC targets are sputtered simultaneously in this case.

Fine active substances generated from each target are attached in the particle form to the intermediate layer 218. The attached particles are subjected to heat treatment and thereby are grain-grown into the above particles 228, to form the anode 214 containing the particles 228 in dense contact with the intermediate layer 218.

By selecting the sputtering conditions, the particle diameter of the grown particles 228 can be controlled to 100 nm or less, and thus the gap distance between the pores 230, 230 can be controlled to 1 μm or less. When the particles 228 of the anode 214 have such a small size, the probability that the oxide ions transferred to the intermediate layer 218 reach the particles 228 is further increased.

The SDC content may be controlled to less than 75 vol %, for example, by applying a lower voltage to the SDC target than to the Pt target in the sputtering.

The MEA 210 (see FIG. 12) can be obtained in the foregoing manner. The MEA 210 has the anode 214 containing Pt-SDC, the electrolyte 212 containing the monocrystal of $La_xSi_6O_{1.5X+12}$ or the like (the c-axis direction being parallel to the thickness direction), the cathode 216 containing a perovskite-type compound (such as LaSrGaMgO, LaSrMnO, or SmSrCoO), a fluorite-type compound (such as YDC, SDC, GDC, or LDC), or an apatite-type compound (such as $La_xSi_6O_{1.5X+12}$ or $La_xGe_6O_{1.5X+12}$), and the intermediate layers 218, 220 containing SDC, YDC, GDC, or the like interposed between the anode 214 and the electrolyte 212 and between the electrolyte 212 and the cathode 216.

The unit fuel cell 236 can be produced from the MEA 210 by disposing the separators 30a, 30b, the current collecting terminals 32a, 32b, and the end plates 34a, 34b on surfaces of the anode 214 and the cathode 216, respectively.

In the third embodiment, one or more of Group 8 metal elements of the Periodic Table may be used in the form of Ni, Pt/Co, Ni/Co, Pt/Pd or the like, instead of Pt in the Pt-SDC for the anode 214. The anode 214 may contain only the metal. Also in these cases, the metal particle has a particle diameter of less than 50 nm.

The structure of the cathode 216 may be similar to the above described structure of the anode 214. Both of the anode 214 and the cathode 216 may have the above structure, and alternatively, only the cathode 216 may have the above structure. Thus, in the present invention, at least one of the anode 214 and the cathode 216 may have the above structure.

The electrolyte-electrode joined assembly may be a substrate-supported-type electrolyte-electrode joined assembly, in which the electrolyte 212 is supported on a supporting substrate. In this case, the electrolyte 212 can have a thickness of 50 μm or less. From the viewpoint of the relation between the power generation function and strength of the assembly, it is preferred that the electrolyte 212 have a thickness of 200 nm to 10 μm.

In the first to third embodiments, the material of the electrolytes 12, 112, 212 is not particularly limited to $La_xSi_6O_{1.5X+12}$. The material may be selected from other apatite-type oxides (such as $La_xGe_6O_{1.5X+12}$) and layered compounds, i.e., a group of BIMEVOX compounds as long as it has anisotropic oxide ion conductivity.

The electrolytes 12, 112, 212 are not particularly limited to the monocrystal, and may contain a sintered body of powder crystals oriented in the c-axis direction. For example, the sintered body can be obtained by adding an apatite compound powder to a solvent to prepare a slurry, solidifying the slurry under a strong magnetic field of approximately 10 T (tesla) to obtain a formed body, and sintering the formed body. Furthermore, the electrolytes 12, 112, 212 may be prepared by firing a body formed using a sol-gel method or by carrying out a gas phase synthesis method such as a CVD, PLD, or ALD method.

Similarly, the material of the intermediate layers 18, 118, 218, 20, 120, 220 is not particularly limited to SDC, YDC or GDC. The material may be another fluorite- or perovskite-type oxide as long as it has isotropic oxide ion conductivity.

Additionally, though the intermediate layers 118, 218, 120, 220 are interposed respectively between the anodes 114, 214 and the electrolytes 112, 212 and between the cathodes 116, 216 and the electrolytes 112, 212 in the second and third embodiments, only the intermediate layers 120, 220 may be provided between the cathodes 116, 216 and the electrolytes 112, 212, and alternatively, only the intermediate layers 118, 218 may be provided between the anodes 114, 214 and the electrolytes 112, 212.

also in these cases, the particles 228 of the anode 214 are densely in contact with the electrolyte 212 in the third embodiment. The gap distance between the connection portions of the particles 228 facing each other across the pore 230 is 1 μm or less (see FIG. 13). Furthermore, the porosity of the anode 214 is maintained within the range of 5 to 40 vol %. Thus, the probability that the oxide ions transferred through the electrolyte 212 reach the particles 228 is higher than the probability that the oxide ions reach the pores 230, whereby the anode 214 can efficiently accept the oxide ions. As a result, the interface resistance between the anode 214 and the electrolyte 212 is lowered, and thus the IR loss of the entire MEA 210 is reduced.

A specific example of the third embodiment will be described below.

A monocrystal of an apatite compound $La_{9.33}Si_6O_{26}$, oriented in the c-axis direction, was prepared by the Czochralski method. The bottom surface of the monocrystal was mirror-polished into a disc having a bottom surface diameter of 17 mm and a thickness of 300 μm (size in the thickness direction parallel to the c-axis direction). Then, a 200-nm-thick SDC ($Sm_{0.8}Ce_{0.2}O_2$) layer was formed on each surface of the disc by sputtering, and the resultant disc was subjected to heat treatment at 1200° C. for 2 hours in the air.

A paste of $La_{0.6}Sr_{0.4}Co_{0.8}Fe_{0.2}O_3$ was applied into a diameter of 8 mm to the surface of one of the SDC layers by screen printing, and subjected to heat treatment at 1100° C. for 1 hour in the air, to form an $La_{0.6}Sr_{0.4}Co_{0.8}Fe_{0.2}O_3$ layer.

A Pt target and an SDC ($Sm_{0.8}Ce_{0.2}O_2$) target were simultaneously sputtered to form a 200-nm-thick Pt-SDC layer on the surface of the other SDC layer. The Pt-SDC layer was subjected to heat treatment at 500° C. for 2 hours. The resultant Pt-SDC layer contained 75 vol % of Pt.

The MEA of Example 24, which had the electrolyte of $La_{9.33}Si_6O_{26}$, the anode of Pt-SDC layer, the cathode of $La_{0.4}Sr_{0.6}Co_{0.8}Fe_{0.2}O_3$ layer, and the intermediate SDC layers interposed between the electrolyte and the anode and between the electrolyte and the cathode, was produced in the above manner. As a result of observation using an SEM, the average distance between the connection portions of the particles of the anode was 0.1 μm. Meanwhile the average distance between the connection portions of the particles of the cathode was 500 nm.

Figure 16:
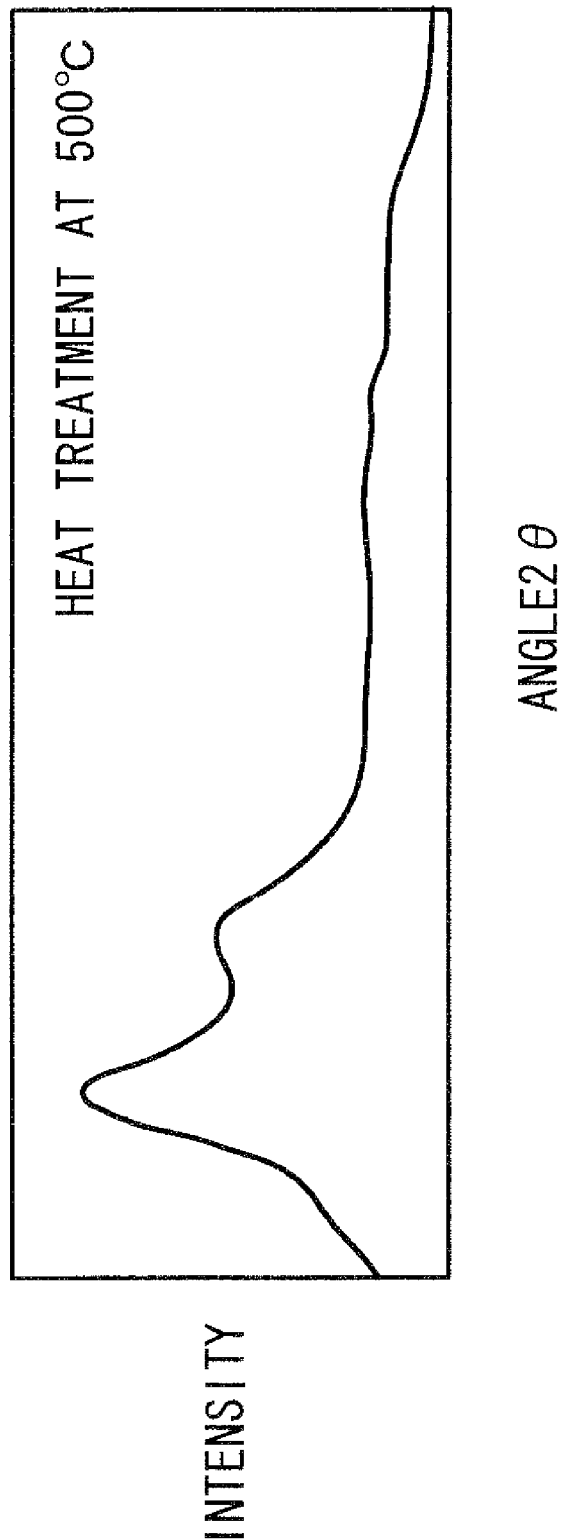
FIG. 16 is an X-ray diffraction measurement pattern of an anode in the MEA of Example 24.

FIG. 16 is an X-ray diffraction measurement pattern of the anode in the MEA of Example 24. As shown in FIG. 16, the anode that has been heat-treated at 500° C. exhibited only broad peaks. This means that the Pt and SDC particles were in an amorphous state.

The MEAs of Examples 25 to 34 were produced in the same manner as Example 24 except for using the materials and thicknesses of the intermediate layer and the anode or cathode as shown in FIG. 17. In FIG. 17, for example, a Pt-SDC layer containing 50 vol % of Pt is represented by "50% Pt-SDC". In Example 29, the intermediate layer was formed only on the cathode.

The anodes of the MEAs of Examples 25 to 34 were also subjected to an X-ray diffraction measurement. As a result, these anodes also exhibited only broad peaks in the same manner as Example 24.

For comparison, the MEAs of Comparative Examples 11 to 15 were produced. In Comparative Examples 11 to 15, for example, an anode was formed by sputtering and then heat-treated at 700° C., or an anode was formed by sintering and then heat-treated at 900° C. or 1400° C.

Figure 18:
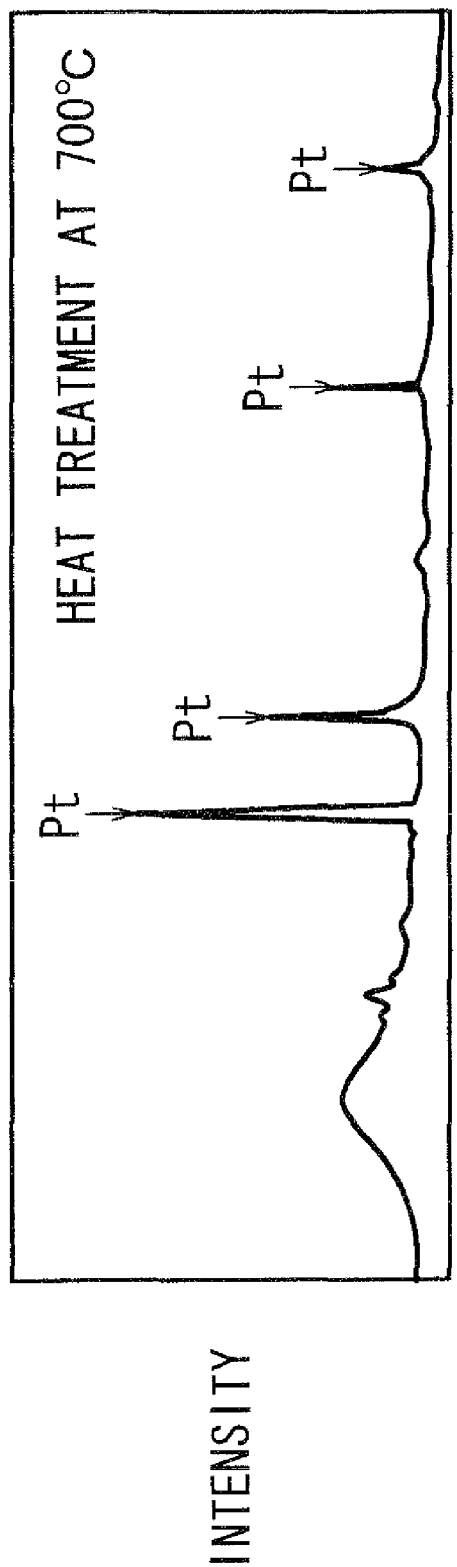
FIG. 18 is an X-ray diffraction measurement pattern of an anode in the MEA of Comparative Example 11.

An X-ray diffraction measurement pattern of the anode in the MEA of Comparative Example 11 is shown in FIG. 18. As shown in FIG. 18, the anode that has been heat-treated at 700° C., exhibited sharp peaks derived from Pt. Thus, when the anode is heat-treated at this temperature, at least the Pt is in a crystalline state. The same result was obtained in Comparative Example 12 though not shown.

The anodes of the MEAs of Comparative Examples 13 to 15 were also subjected to an X-ray diffraction measurement. As a result, these anodes exhibited sharp peaks of the Pt and SDC though not shown.

In FIG. 17, the results are shown as "electrode crystallinity" together with the results of Examples 24 to 34. Specifically, "Amorphous" in Examples 24 to 34 means that the X-ray diffraction measurement patterns exhibited only the broad peaks, and "Pt" or "Pt, SDC" in Comparative Examples 11 to 15 means that the patterns exhibited the sharp peaks of Pt or Pt and SDC.

A unit fuel cell was produced using each of the MEAs of Examples 24 to 34 and Comparative Examples 11 to 15. $H_2$ was supplied to the anode at a flow rate of 15 cc/minute, and a compressed air was supplied to the cathode at a flow rate of 100 cc/minute, to produce electric power. The output powers of the unit fuel cells at 300° C. and 500° C. are shown in FIG. 17.

It was clear from the comparison of the output voltages at 300° C. and 500° C. that the unit fuel cells of Examples 24 to 34 were more excellent in power generation function than the cells of Comparative Examples 11 to 15.

The invention claimed is:

1. An electrolyte-electrode joined assembly comprising an anode and a cathode with an electrolyte interposed therebetween, wherein
    the electrolyte comprises an apatite-type oxide in the form of a monocrystal having a face or a direction in which an oxide ion is transferred, or in the form of a polycrystal oriented along a face or a direction in which an oxide ion is transferred, the face or the direction being parallel to the thickness direction,
    the anode contains at least electron-conductive metal particles having a particle diameter of less than 50 nm, and oxide-ion-conductive oxide ceramic particles,
    the content of the oxide ceramic particles is less than 75 vol %, and
    the metal particles are in contact with each other continuously from one surface of the anode that faces the electrolyte to the other surface of the anode.

2. An electrolyte-electrode joined assembly according to claim 1, wherein the anode has a thickness of less than 10 μm.

3. An electrolyte-electrode joined assembly according to claim 1, wherein the metal particle is a particle containing one or more of Ni, Co, Pd, Ag, Pt, Zn, and Cu.

4. An electrolyte-electrode joined assembly according to claim 2, wherein the oxide ceramic particle is a particle containing one or more of perovskite-type compounds, fluorite-type compounds, and apatite-type compounds.

5. An electrolyte-electrode joined assembly according to claim 1, further comprising an intermediate layer having a thickness of less than 1 μm at least between the cathode and the electrolyte or between the anode and the electrolyte.

* * * * *